March 2, 1943. F. S. SMITH 2,312,368
METHOD AND APPARATUS FOR DESTROYING INSECT
LIFE IN FLOUR AND THE LIKE IN BULK
Filed March 16, 1939 8 Sheets-Sheet 1

INVENTOR
Franklin S. Smith
BY William T. Kuiesna
ATTORNEY

March 2, 1943.  F. S. SMITH  2,312,368
METHOD AND APPARATUS FOR DESTROYING INSECT
LIFE IN FLOUR AND THE LIKE IN BULK
Filed March 16, 1939  8 Sheets-Sheet 2
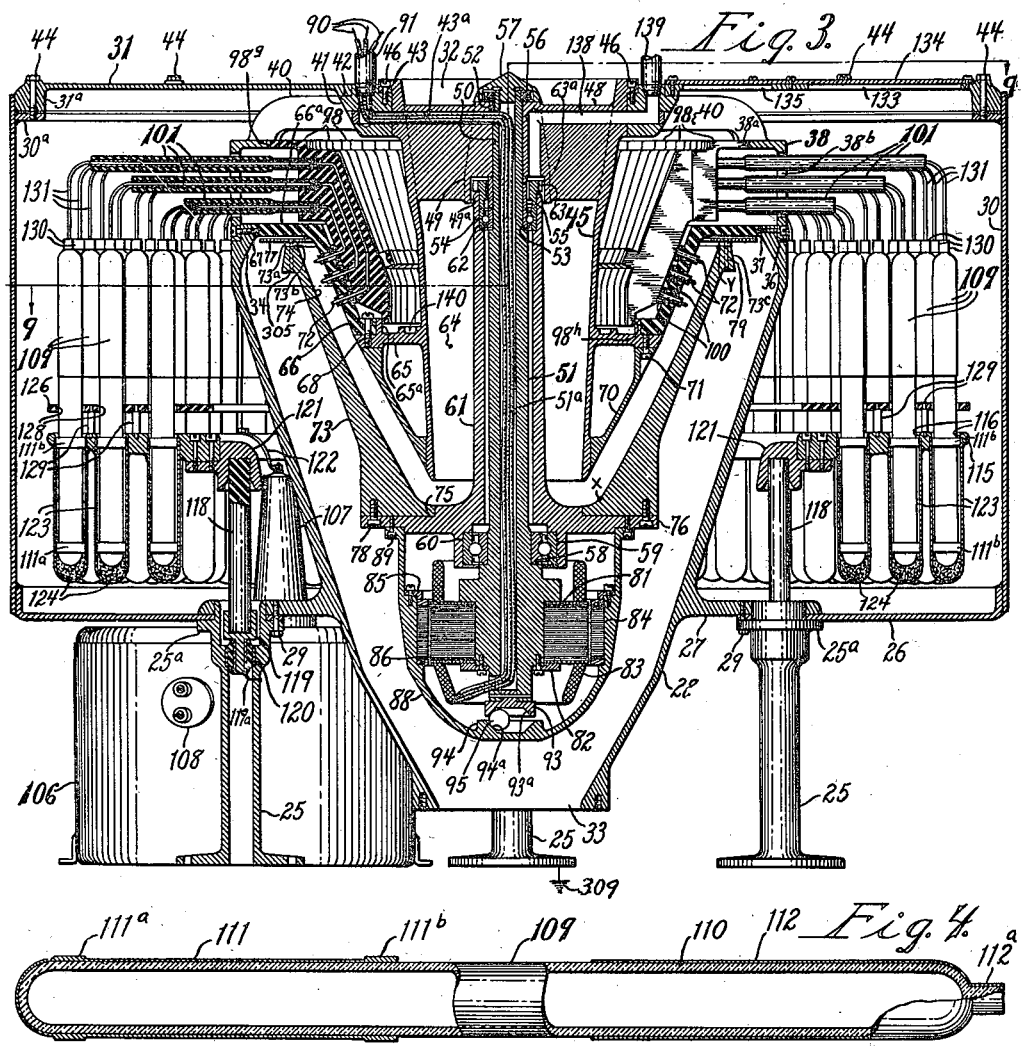
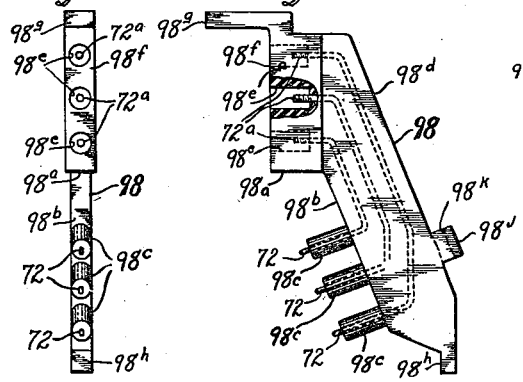
INVENTOR
Franklin S. Smith
BY William T. Kniesner
ATTORNEY March 2, 1943.   F. S. SMITH   2,312,368
METHOD AND APPARATUS FOR DESTROYING INSECT
LIFE IN FLOUR AND THE LIKE IN BULK
Filed March 16, 1939   8 Sheets-Sheet 3
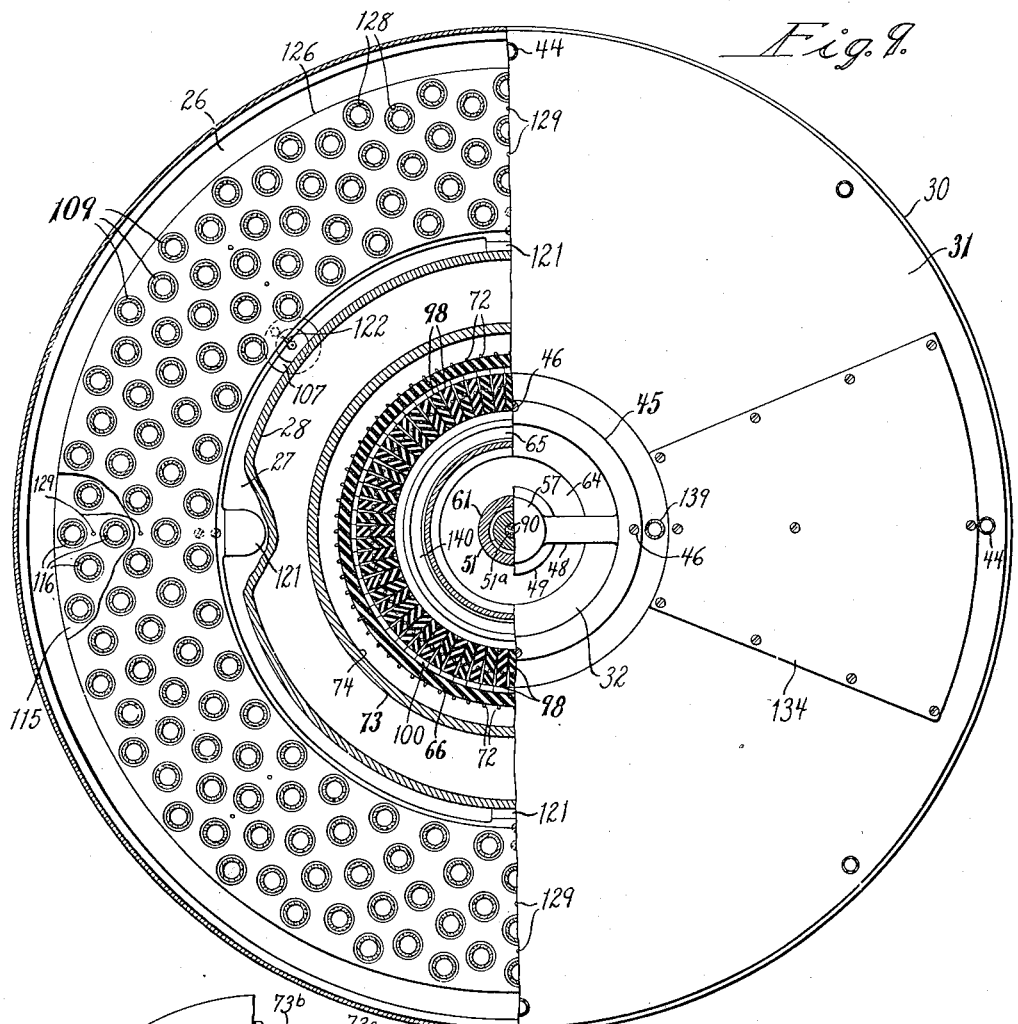
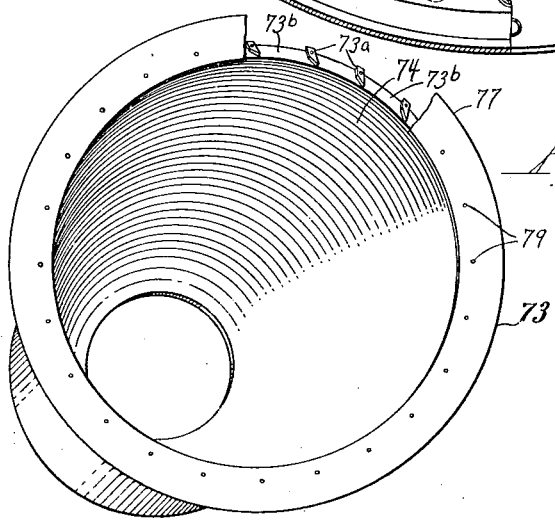
INVENTOR
Franklin S. Smith
BY William T. Kniesner
ATTORNEY

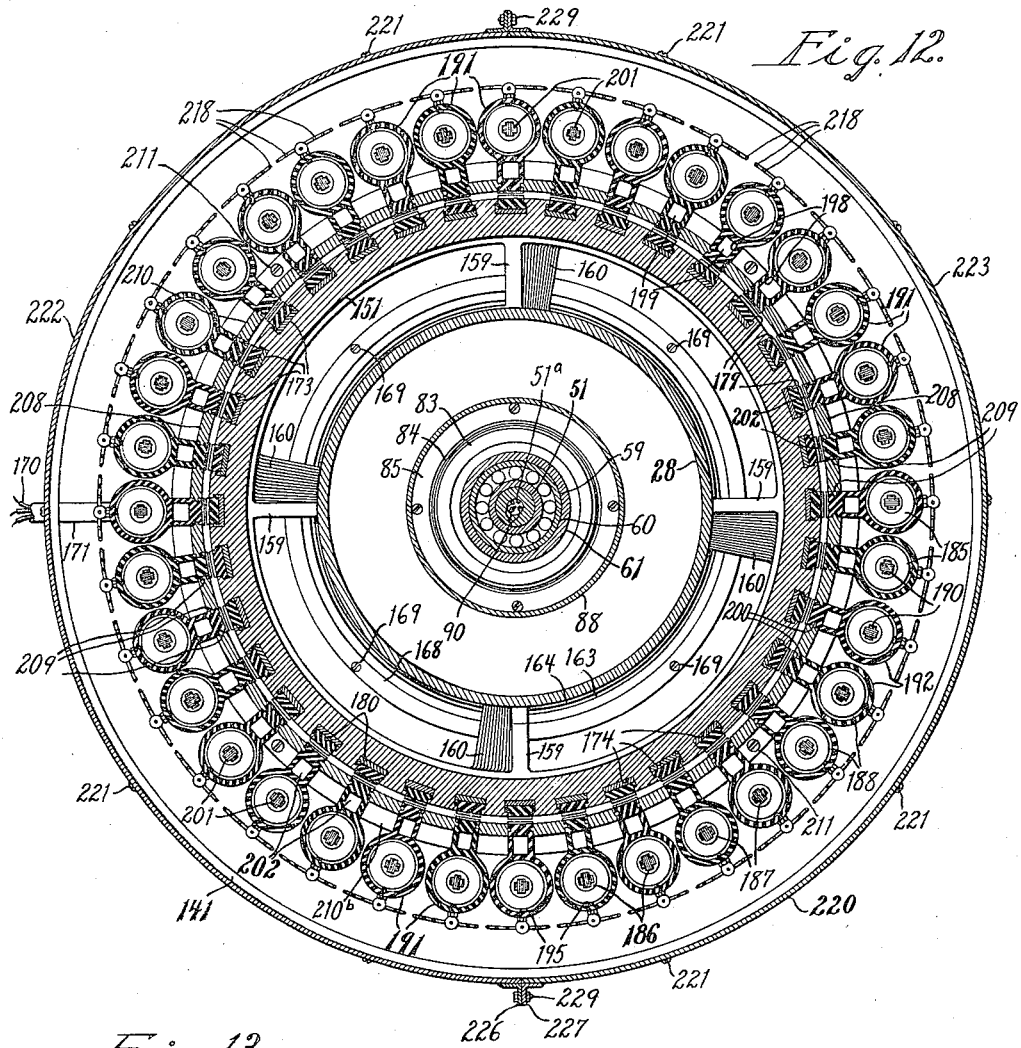
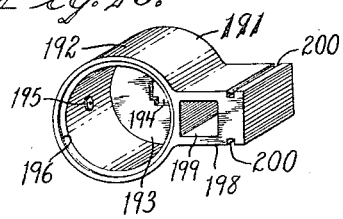
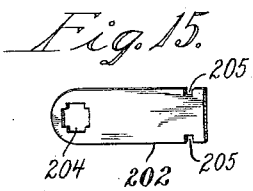
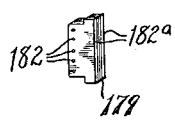
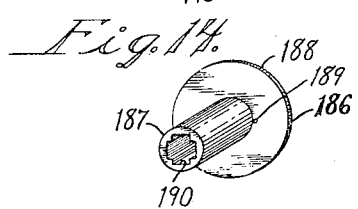
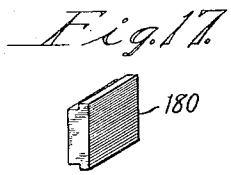
INVENTOR
Franklin S. Smith
BY William T. Kiesner
ATTORNEY March 2, 1943.       F. S. SMITH       2,312,368
METHOD AND APPARATUS FOR DESTROYING INSECT
LIFE IN FLOUR AND THE LIKE IN BULK
Filed March 16, 1939       8 Sheets-Sheet 6
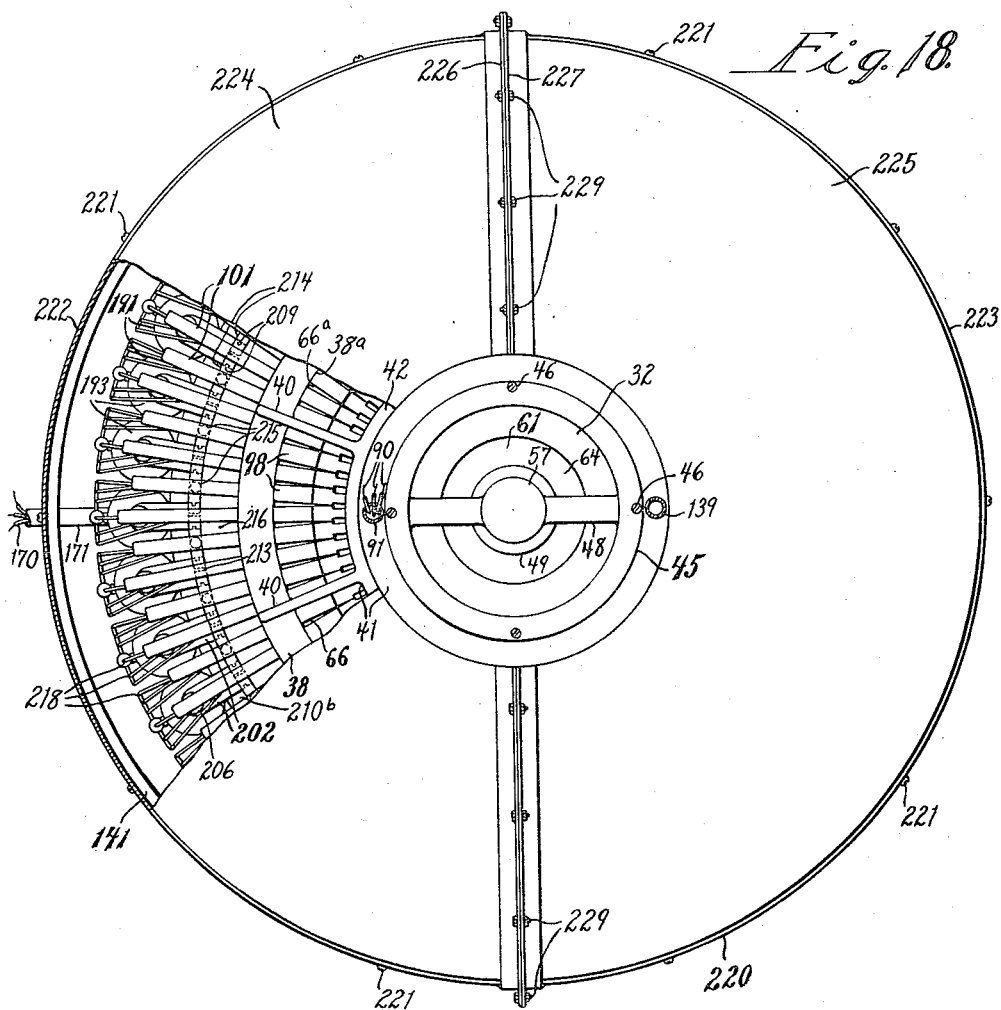
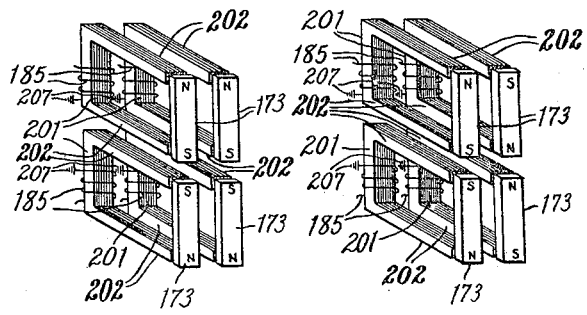
INVENTOR
Franklin S. Smith
BY William T. Kniesner
ATTORNEY

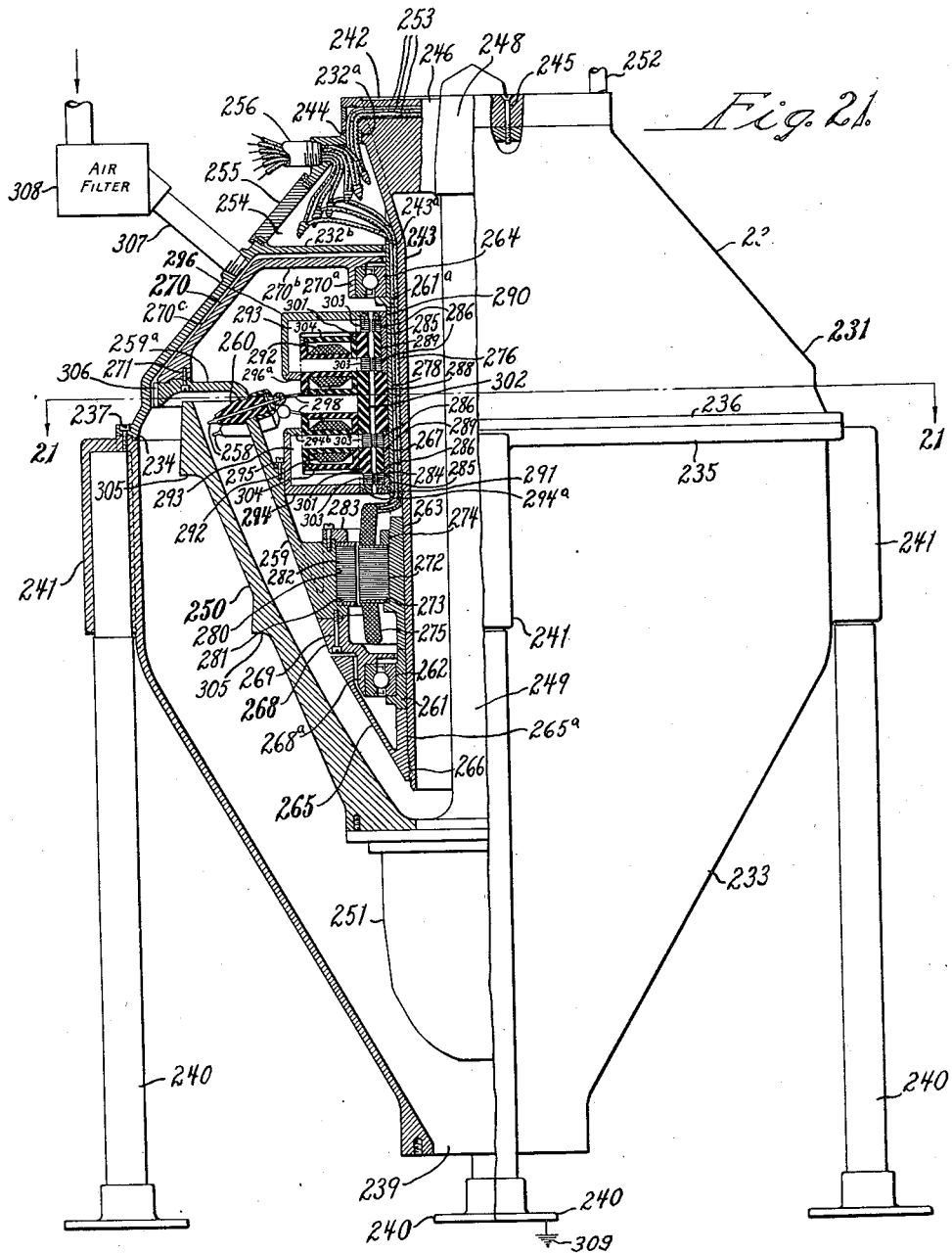

March 2, 1943.                F. S. SMITH                    2,312,368
           METHOD AND APPARATUS FOR DESTROYING INSECT
                 LIFE IN FLOUR AND THE LIKE IN BULK
                     Filed March 16, 1939           8 Sheets-Sheet 8

INVENTOR
Franklin S. Smith
BY William T. Kiesmer
ATTORNEY

Patented Mar. 2, 1943

2,312,368

UNITED STATES PATENT OFFICE 2,312,368

METHOD AND APPARATUS FOR DESTROYING INSECT LIFE IN FLOUR AND THE LIKE IN BULK

Franklin S. Smith, New Haven, Conn.

Application March 16, 1939, Serial No. 262,155

32 Claims. (Cl. 21—102)

This invention relates to a method and apparatus for destroying insect life in food products, particularly milled products in bulk, such as flour.

One of the objects of this invention is to provide a practical, dependable and efficient method and apparatus for treating food products of the above-mentioned nature to achieve the destruction of insect infestation therein, usually in the form of eggs, larve, pupae, or adults. Another object is to provide a method and apparatus of the above-mentioned character whereby such products may be so treated in bulk and more particularly in the course of their movement along a continuous stream or path of flow and thus also to make it possible to interpose my method or apparatus at any suitable or appropriate point in the otherwise usual or normal production or handling in mills of such products.

Another object is to provide a safe and efficient method and apparatus for electrically destroying insect life in flour and to carry out that object in a manner that is free from the danger of so-called "dust" explosions. Another object is to provide a practical, simple and dependable apparatus for achieving a continuous flow or movement of flour or like products, to effect electrically the destruction of insect life therein, and at the same time to so control the flow or movement of the product that such electrical action is achieved without giving rise to the possibility of flour dust explosion. Another object is to provide an apparatus of the above-mentioned character in which the destruction electrically of insect life may be achieved by disruptive discharge or spark-over and to achieve simple and dependable control or determination of the rate of flow of the flour product through the discharge zone and of the mass or quantity of flour product present at any moment in the discharge zone. Another object is to provide in apparatus of the above-mentioned character simple and effective means for dependably so correlating the energy of electrical discharge and the nature and character of movement of the flour or flour products that dust explosion cannot take place.

Another object is to provide an apparatus and method for treating comminuted food products like flour, in bulk, and to provide simple and dependable control of the product so as to negative or minimize the creation of a dust-like atmosphere laden with particles of the food product being treated, and thus to avoid giving rise to explosive dust atmosphere. Another object is to provide a simple and dependable method and apparatus for effecting continuous or steady flow of comminuted food products like flour into or through the treatment zone. Another object is to provide a dependable method and apparatus for effecting suitable flow at appropriate density of the comminuted product into or through the treatment zone.

Another object is to provide a safe and compact flour-treating apparatus, capable of reliable and efficient action, and well adapted to meet the varying requirements and conditions of practical use. Another object is to provide an apparatus of the above-mentioned character that will be capable of facility of assembly or replacement of its various parts. Another object is to provide an apparatus for electrically treating comminuted food products like flour that will be dependably free from danger of dust explosions and in which the flow or movement of the finely divided product is controlled with such dependability that electrical apparatus of high voltage and also electrical discharge devices may be safely and dependably associated with it. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which are shown several of the various possible embodiments of the mechanical and electrical features of my invention, Figure 1 is a front elevation on a small scale of one form of apparatus;

Figure 3 is a central vertical sectional view, as seen along the line 3—3 of Figure 2;

Figure 4 is an elevation partly in section, on an enlarged scale, of one of several energy-limiting devices used in the apparatus of Figures 1-3;

Figures 5, 6 and 7 are, respectively, front, side and top elevations, on an enlarged scale, of one of several electrode supports;

Figure 8 is an elevation on a larger scale, partly in section, of a connector device for facilitating the electrical connections to the electrodes;

Figure 9 is a horizontal sectional view of the apparatus as seen along the line 9—9 of Figure 3;

Figure 10 is a detached perspective view of a member forming part of the apparatus of Figures 1, 3 and 9;

Figure 12 is a horizontal sectional view, as seen along the line 12—12 of Figure 11;

Figures 13 and 14 are perspective views on a larger scale of companion parts of an insulating structure for housing a winding and for effecting assembly of winding and certain core construction and pole pieces of generator units embodied in the construction of Figures 11 and 12;

Figure 15 is a perspective view on a larger scale of a lamination of a core leg of the generator units;

Figure 16 is a perspective view on an enlarged scale of a pole piece for a permanent magnet element of the generator units;

Figure 17 is a perspective view on a larger scale of a spacer of insulating material used in the generator units;

Figure 18 is a plan view of the apparatus of Figure 10 with certain of the parts being broken away;

Figures 19 and 20 are diagrammatic perspective views showing respectively two ways of assembling or interrelating certain elements of the above-mentioned generator units;

Figure 21 is a front elevation with the left half in central vertical section, of another form of apparatus;

Similar reference characters refer to similar parts throughout the several views of the drawings.

Figure 1:
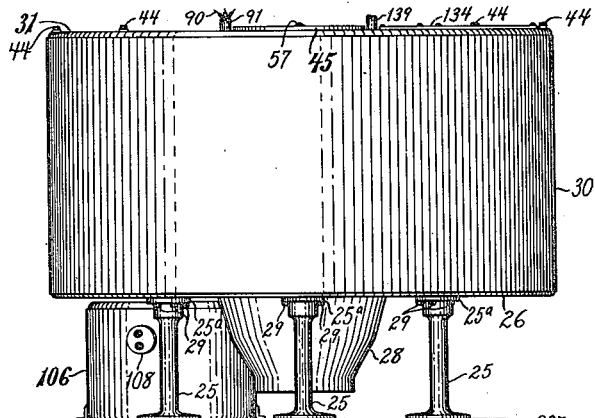
Figure 2:
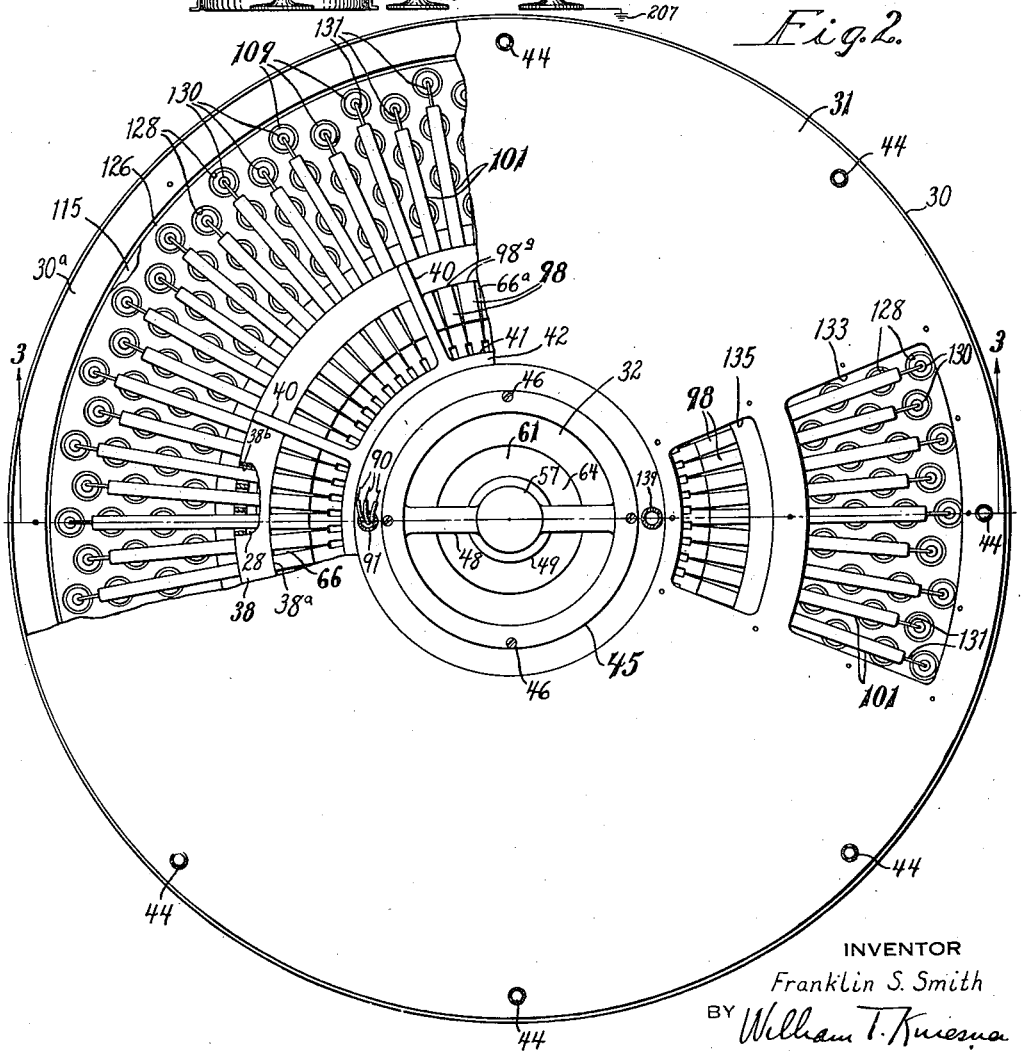
Figure 2 is a plan view as seen from above in Figure 1, certain parts being broken away and certain other parts being removed in order to show certain features of the construction more clearly.

Referring now to the drawings and more particularly to Figures 1, 2 and 3, I preferably provide a suitable base or standard, illustratively in the form of several pedestals or legs 25, illustratively four in number and preferably grouped equidistantly about a central vertical axis, adapted to rest upon a floor or like support and to be secured to the latter in any suitable way if desired; the legs or standards 25 support and have secured thereto an annular base portion 26 of a casing or housing later to be described and also an annular flange 27 that extends about and is preferably formed integral with a tapered or frusto-conical member 28 whose vertical axis preferably forms the central vertical axis of the apparatus and with respect to which I preferably relate other parts of the apparatus, as later described.

As better shown in Figure 3, the upper ends of the legs 25 may be provided with a flange 25ᵃ against which the overlapped adjacent and apertured ends of the annular members 26 and 27 are supported and to which they may be clamped or secured as by cap screws 29.

The parts 26 and 27 thus form a closed annular bottom for the casing structure, with the lower portion of the frusto-conical member 28 projecting centrally and downwardly therefrom, while the outer peripheral portion of the part 26 has secured to it as by welding an upwardly extended cylindrical casing part 30 closed over at its upper end by a cover plate 31 (Figures 2 and 3), the cover plate 31, certain details of which are later described, having at its center a round opening with which is associated, in a manner later described, a suitable means forming an entering opening or passageway through which the comminuted food product like flour enters the apparatus within the casing structure. This entry opening or passageway, indicated in Figures 2 and 3 at 32, may be connected in any suitable way, as by a conduit (not shown) to receive the product which, after treatment in the manner later described, is discharged through the exit opening 33 (Figure 3) at the bottom end of the frusto-conical member 28; the opening 33 is preferably constructed as indicated in Figure 3 to permit securing it to a conduit, or the like, to pass the product on. It will be noted that preferably entry opening 32 and exit opening 33 are coaxial with the central vertical axis of the apparatus as a whole, and thus the completely encased apparatus may be easily and quickly connected into an existing arrangement of machines or mechanisms or the like of a mill for the preparation and handling of such food products.

The funnel-like or tapered member 28 is preferably in the form of a casting and is preferably made to function as a main frame-like support for a number of parts of the apparatus; thus, its upper end, as viewed in Figure 3, terminates in a relatively heavy and preferably inwardly directed flange or annulus 34 with its under face given a curvature of suitable radius, as shown, while its inner and outer cylindrical faces are rabbeted as at 36 and 37. In the rabbet 36 is received the lower end of an angle-cross-sectioned ring 38, being secured in place as by screws 39 and being provided with a suitable number of inwardly and radially extending arms 40 (Figures 2 and 3), arms 40 terminating in a ring member 41 whose upper end, as seen in Figure 3, is rabbetted as at 42 and 43. It is with the outer of these two rabbets, namely rabbet 42, that the above-mentioned centrally apertured cover plate 31 interfits, the outermost and peripheral portion of the cover plate 31 (see Figure 3) being suitable strengthened or reinforced by an annular downwardly extending rib 31ᵃ which rests upon an inwardly extending flange 30ᵃ of the cylindrical casing portion 30, to which flange 30ᵃ the annular cover plate 31 may be secured as by cap screws 44.

The above-mentioned ring member 41 (Figure 3) is by the arms 40 and the ring 38 and rabbet 36 positioned and held coaxial with the central vertical axis of the apparatus and hence and preferably is made to relate certain other parts coaxially with this vertical axis. Thus, in the rabbet 43 (Figure 3) of ring member 41 is seated the flange of a member 45 which, like the frusto-conical member 28, is preferably made to serve both as an auxiliary support and a guideway or passageway. Thus, member 45, preferably in the form of a casting, may be in general cylindrical in shape to extend downwardly into the frusto-conical member 28 to an appropriate extent and also coaxially therewith, its upper end being conveniently tapered outwardly to form the above-mentioned entry opening or passageway 32 for the product to be treated. Member 45 may thus be assembled to the apparatus from above, being let down into and through the ring support 41 to which it may be secured as by screws 46.

Bridging across and in effect bifurcating the upper end of the passageway through the member 45 and preferably formed integrally therewith is a cross-rib 48 (Figures 3 and 2) with a hub-like enlargement 49 at its center to provide adequate material and strength after being bored out as at 50, again along the above-mentioned central vertical axis, to receive therein and to position coaxially with that vertical axis a downwardly extending relatively rigid and strong tube-like support 51.

Tube-like support 51 may be rigidly secured in the bore 50 in any suitable way, preferably as follows:—Thus, the upper end portion of tubular support 51 may be of reduced diameter to be snugly received in the bore 50 and to provide a shoulder 53 (Figure 3) against which rests the inner race of a combined radial and thrust anti-friction bearing 54, there being interposed between that inner race and the counterbored part 49ª of the hub portion 49 a sleeve 55; the extreme upper end of the tubular support 51 is threaded to receive a nut 56 which, when tightened up, clamps the hub portion 49, the sleeve or collar 55, and the inner race of the bearing 54 between itself and the shoulder 53, thus rigidly securing the tubular support 51 in depending relation to and coaxially with the frusto-conical frame member 28 and related parts. Key 52 positions and retains support 51 in correct circumferential relation to hub 49.

The uppermost end of the tubular support 51 and the nut 56 are preferably completely closed over and sealed as by a cap-like part 57 which, being with the cross-rib 48 in the path of downward flow of the comminuted product is, like the cross-rib 48, suitably shaped to offer small or negligible resistance to the downward flow of the material.

Spaced downwardly from the bearing 54 (Figure 3) the tube-like support 51 is shouldered as at 58 to receive thereon and against the shoulder the inner race of a combined radial and thrust anti-friction bearing 59, the outer race of which is received in a suitable seat formed as at 60 at the lower end of a rotatable sleeve shaft member 61 that extends upwardly and about the tubular support 51 and well into the counterbore 49ª of the hub portion 49. At its upper end the sleeve shaft 61 is shouldered as at 62 to receive thereagainst the outer race of the bearing 54 which is secured or clamped against the shoulder by a collar 63 pressed into the upper threaded end of the sleeve shaft 61. The sleeve shaft 61 thus extends downwardly along the axis of the member 45, and, with the cylindrical wall of the member 45, the external cylindrical surface of the sleeve shaft 61 forms an annular downward passageway extension 64 of the above-mentioned entry opening or passageway 32. But sleeve shaft 61 is also dependably supported for rotation and by the above-described construction shaft 61 with other parts related to it as later described may, as a unit with the tubular support 51, be assembled to the hub portion 49 of the supporting ring 41.

As above noted, the member 45 is preferably also made to serve to take part in supporting certain other parts; thus, it is provided with a horizontal annular flange 65 (Figures 3 and 9) suitably shaped to form an annular seat for a frusto-conical member 66 made of any suitable solid dielectric material like Bakelite and secured in position as by screws 68. And, as is better shown in Figure 3, the upper end of the member 66 is flanged or extended horizontally, as at 66ª, being rabbeted, as shown, to interfit with gasket 67 on the rabbet 37 of the flange portion 34 of the frusto-conical member 28. The solid dielectric member 66 may thus be given a strong and dependable mechanical support while its external surfaces, as viewed in Figure 3 comprise a frusto-conical surface substantially paralleling the internal surface at the upper end of the frusto-conical member 28, suitable curvatures or configurations being provided to merge the outer surface of member 66 into the curved surface of member 28.

The lateral face of flange 65 is preferably shaped to form a downward continuation of the frusto-conical surface of member 66, and that in turn is extended downwardly and inwardly to merge into or join the lower open end of the passageway 64 in the member 45; for this latter purpose I may provide a frusto-conical part 70, which may be metallic, shaping it at its lower end so that it snugly fits over the lower end of the member 45 and shaping it at its upper end to rest against the under face of the flange 65 to which it may be secured as by screws 71.

Projecting outwardly from the insulating frusto-conical member 66 and extending and preferably uniformly distributed throughout a suitable band-like portion of member 66 are electrodes 72 which, as shown in Figure 3, are, by way of illustration, arranged in three circular rows and which, as will later appear, may be of any suitable number, illustratively seventy-two electrodes per circular row. The preferred form which these electrodes take and means for suitably energizing them for electric discharge are later described in detail though it might at this point be noted that they are preferably so energized that in coaction with a companion electrode structure about to be described they form an annular or ring-like treatment zone in which preferably disruptive discharge takes place; with the comminuted food product, hereinafter for convenience simply called flour, entering the apparatus through the entry opening 32 and passing downwardly in the annular passage 64 (Figure 3) to emerge from the lower end of the latter, the flour is now to be brought at a suitable rate of flow or movement and at an appropriate density into and through this annular treatment zone to be subjected to the discharge emanating from the electrodes 72. For this purpose, and in the light of the peculiar physical characteristics of flour, such as its finely pulverized character, its variable degree of compacting under force or pressure, its tendency to form dust-like suspensions in the air, and the like, I prefer to relate to the rotatable sleeve shaft 61 and to rotate with it a bowl-like or generally frusto-conically shaped member 73, mounting it so that its inner wall surface 74 extends from the discharge end of the annular passageway 64, thence upwardly and outwardly past the electrodes 72. The ends or discharge surfaces of the latter are preferably alined to be equidistant from the juxtaposed portion of the inner surface 74 of the rotatable member 73, thus to insure substantial identity of gap length, that is, from the electrodes 72 to the inner surface of the member 73 which is thus to form an electrode common and companion to all of the electrodes 72.

Preferably member 73 is made of a suitable metal, such as anodized aluminum alloy, and conveniently is shaped in the form of a frusto-conical annulus suitably shaped at its lower end, as better appears in Figure 3, to interfit with a suitable rabbet 75 formed in the upper face of a disk-like flange or carrier 76 preferably formed integrally with the sleeve shaft 61, just below the lower mouth of the part 45. Member 73 may thus be easily assembled to the sleeve shaft 61 and secured to the flange 76 thereof as by screws 78; it thus partakes of the rotation of the sleeve shaft 61 and preferably it is dynamically balanced so that its rotation even at high speeds is substantially vibrationless.

When driven at a speed suitable to the curvature or inclination of its inner surface 74 and to the radii from the axis of rotation, the member 73 effects a steady and continuous upward and outward flow of the flour along its surface 74 into and through the treatment zone, in a preferred manner described in greater detail later, whence it tangentially discharges into the interior of the frusto-conical member 28 down which it slides to be discharged through the discharge opening 33. Accordingly, by suitably correlating the factors of speed of rotation of the part 73, the dimensions and shaping of the interior surface of the latter, and the particular characteristics of the comminuted food product to be treated, a desired or suitable rate of flow of product, density or degree of compacting of the product in the treatment zone, or thickness of the layer of the product in the treatment zone may be achieved.

For example, for the sterilization of flour, satisfactory results are achieved where the speed of revolution of the member 73 is 1150 R. P. M., with the dimensions and shape of the surface 74 of member 73 substantially as follows: minimum internal diameter approximately 9″, maximum internal diameter 20″, height 12.5″; preferably the radius of the surface 74 in passing from the plane of minimum diameter to the plane of maximum diameter varies non-linearly and hence the surface 74 when viewed as in the section of Figure 3, partakes of some curvature. Illustratively, the curvature is or may approximate a portion of a hyperbola whose asymtotes subtend an angle of about 36°. More particularly, in the just stated illustrative example, only a portion of the hyperbola is employed, and such a portion that the angle subtended by tangents at the points X, X in Figure 3 (the place of minimum inside diameter) is about 60°, and the angle subtended by tangents at the points Y, Y (where the diameter is maximum) is about 38°. With such an illustrative structure, the member 73 passes flour upwardly into and through the treatment zone at the rate of about 400 pounds per minute, maintaining a steady upward and outward progression of the flour along the surface 74, moving it through the annular treatment zone about the electrodes 72 in a substantially steady or continuous layer of an average thickness preferably not exceeding about half the spark-gap length, the latter being about 0.5″.

It is desirable to maintain substantial constancy of speed of rotation of the combined transport and electrode members 73, for it is possible that too great departures from the speed that is optimum for the other factors, such as rate and range of change of radius of the surface 74, might detrimentally affect the achievement of all of the desirable advantages and results of the method and apparatus or impair the efficiency or effectiveness of other desirable functions of the apparatus. Accordingly, I prefer to associate with the tubular support 51 and the sleeve shaft 61 a suitable source of driving energy having the characteristic of substantial constancy of speed of rotation, as attained in commercial practice.

Preferably, this takes the form of an electric motor, preferably of the alternating current type, such as, for example, an induction motor, the speed of drive of which, the power supply and load being substantially constant, would likewise be substantially constant. Conveniently, the tubular support 51 has an enlarged downward extension provided with a shoulder 81 against which are clamped, as by a clamping ring 82, the laminations of a field or stator structure suitably shaped or conformed to have related to it energizing windings 83.

The rotating element or rotor of the motor may comprise suitably shaped laminations 84 which are clamped by a clamping ring 85 held by screws against a shoulder 86 formed internally in a dome-like housing or casing 88 which takes over and encloses the downward extension of the tubular support 51 with its stator core and winding, being secured as by screws 89 against the under face of the disk-like flange or carrier 76 of the sleeve shaft 61, being suitably centered or alined therewith in any suitable way as, for example, by interfitting with a rabbet, as shown in Figure 3, on the under face of the flange 76.

Electrical connection to the windings 83 is preferably achieved by way of conductors 90 which extend into and through the passageway 51$^a$ and through a hole in the tubular support 51 which alines with a passageway 43$^a$ formed in the cross-rib 48 and through a connecting passage in the ring member 41 (Figures 2 and 3); to the latter a suitable conduit or the like, indicated at 91, may be connected to lead the conductors to the source of energy supply.

Accordingly, energization of the windings 83 sets the rotor 84 into rotation, driving the sleeve shaft 61 and the bowl-like member 73 directly through the motor housing or casing 88 connected thereto as above described. The motor may be designed and constructed to give a speed of rotation of 1150 R. P. M., in the above-described illustrative example, and may be of such a type or of such characteristics as to achieve and maintain substantial constancy of speed.

With substantial constancy of speed of drive of the member 73, the action of the latter upon the flour may be maintained substantially uniform and invariable. Flour is fed, by suitable conventional means not shown, to entry opening 32 of member 45 in such direction that the flour stream is bifurcated by cross-rib 48. The flour, having air entrained with it, then descends by gravity in the annular passageway 64 of member 45 in a stream of somewhat uniform distribution of cross-section. Upon contacting the annular bottom of the rotating member 73 the flour partakes of the rotory motion of member 73 and is distributed rapidly and uniformly about the axis of rotation of member 73. Due to the centrifugal force exerted by the moving flour, the flour moves in an outward direction and hence against the lowermost portion of the upwardly and outwardly inclined inner surface 74 of member 73, for example, against portion $x$ in Figure 3.

Due to the configuration of the surface 74 of member 73 which effects a control of the variation in centripetal force acting upon the flour, and due to the centrifugal force exerted by the flour and its entrained air, the flour and air move outwardly and upwardly in expanding curvilinear paths about the axis of member 73.

Just prior to the flour and air entering the treatment zone a sufficient centrifugal separation of flour and air has been effected, so that an outer annular layer of flour substantially free of air and an inner annular layer of air substantially free of flour in suspension pass through the treatment zone.

Thus, a steady upward flow of flour along the surface 74 of member 73 may be effected, and a dependable passage of the flour with its contained insect infestation into and through the treatment zone brought about, and in the preferred form the actual path of movement of any particle of flour, with respect to the vertical central axis of member 73, is a composite or a resultant of a helix and a spiral. In the illustrative form, it is possible to achieve an effective flow of flour at the rate of about 400 pounds per minute with an average thickness of flour layer as it passes the electrodes 72 in the annular treatment zone about a quarter of an inch, where the length of the spark gap from the tip of any one electrode 72 to the surface 74 of the common electrode member 73 is about one-half inch.

The rate of supply or feed of flour to the apparatus may, of course, be cut down if desired or according to operating requirements, and in such case the rate of flow of flour is correspondingly less and the average thickness of flour layer in the treatment zone correspondingly diminished. First, I make certain that no flour particles are suspended in dust-like formation in any air space between the inside surface of the layer of flour and the external frusto-conical surfaces of the members 70 and 66 (Figure 3). The above-described centrifugal action by the flour particles precludes the production of any dust-like atmosphere in any such air space, and thus the spark-over or electrical discharge from the electrodes 72 to the companion electrode member 73 may freely take place without danger of dust explosion. Also, the above described centrifugal separation of entrained air from the flour compacts the flour particles in the upwardly moving layer, preventing particles from flying off of the surface of the layer to create a dust atmosphere and also insuring a steady progression of the particles into and through the treatment zone. In such compacted form, the flour is subjected to the electrical discharge, its occupied volume being about halved or its apparent density about doubled. Thus also the spark discharge cannot dislodge flour particles into the inner layer of air to form an explosive mixture.

When the flour reaches the upper edge of member 73, the centripetal and centrifugal forces collapse and it discharges tangentially. Preferably, it discharges through a plurality of slot-like apertures 73b distributed peripherally about the upper edge face of the member 73, as is better shown in Figure 10; these apertures are preferably formed between vane-like members 73a which may be formed integrally with the member 73, members 73a being surmounted by an annular flange 77 secured as by screws or rivets 79.

As is better shown in Figure 3, member 77 has its upper face parallel and closely spaced to the under face of the horizontal portion 6Ja of the insulating member 66 and preferably acts also as a centrifugal fan to prevent ingress of air and flour.

The vanes 73a preferably also act as impellers, their leading vertical faces having suitable inclination, as indicated in Figure 10, assuming clockwise rotation of the member 73; they thus coact with the member 73 in tangentially expelling air from the treatment zone and also the flour as it reaches the upper edge of member 73. These actions may also help prevent such turbulence in the treatment zone as might stir up flour particles and bring them into suspension in the air. Also, such an outward flow of air from the treatment zone may act as a dependable barrier to prevent any air with flour suspended in it from entering the treatment zone from the discharge space externally of the member 73.

Illustratively, as earlier noted, the electrodes 72 are preferably numerous and preferably uniformly distributed, as above described, for example, in three rings or rows of seventy-two electrodes each. If the electrical energy impressed across the spark gaps is of suitable frequency, for example, 60 cycles per second, a disruptive discharge or spark-over takes place at each electrode 72 for each half wave of the alternating potential applied. The band-like or annular treatment zone, when the electrodes are energized, is thus one in which, in the illustrative embodiment, a large number of electric discharges take place in rapid succession or repetition; for convenience and lower cost of manufacture, the electrodes 72 may be and preferably are uniformly distributed throughout this zone. Thus, in the illustration, they are arranged in three circular rows, the lower row being preferably spaced vertically from the central row slightly more than the upper row is spaced from the central row, as seen in Figure 3, and the electrodes in each row being equally spaced as will later be set forth, this arrangement resulting substantially in equidistant spacing of all electrodes.

But with respect to such preferred uniform distribution of the discharge electrodes 72, the path of movement of any portion or particle of the flour or its insect infestation that is to be treated, is such that it cannot escape being presented in juxtaposition to more than one of the electrodes 72 since the path of movement of any such portion or particle, due to the rotation of the member 73 and due to the upward movement of the flour, is a composite of these two effects and hence is, as earlier noted, a composite of a helix and a spiral relative to the axis of the electrode 72.

Thus, it becomes impossible for an insect in any stage of its life to escape destruction, if it is contained in the flour thus passed through the treatment zone. The insect contamination need not be directly juxtaposed to an electrode 72, since the discharge emanating from the electrode in effect seeks out the contamination because the relatively higher permittivity of the insect, in whatever its form, is high as compared to the adjacent media, and because the spark gap length substantially exceeds the thickness of the flour layer. Thus, there is ample assurance that sterilization results.

As noted above, the electrical discharge is preferably disruptive, and also relatively free from corona; this is preferable in order to avoid substantial ozone production, in such cases where subjection of the product to ozone is not desired or is objectionable. A suitable and illustrative potential difference between the electrodes 72 and the companion electrode member 73 is about 17 kilovolts effective, where the gap length is substantially 0.5". Preferably, the voltage is sufficient for the discharge to bridge the gap while no flour is present. Preferably, also, the common electrode member 73 is maintained at ground potential, being suitably grounded to the apparatus, while preferably all of the electrodes 72 are maintained at the high potential relative to the common electrode 73, but preferably by way of certain safeguards later described.

The grounding of the rotating and common electrode member 73 to the grounded frame of the apparatus would, with the construction of Figure 3 as thus far described, take place through the bearing members 54 and 59 by which the sleeve shaft 61 is rotatably supported on the tubular support 51; where anti-friction bearings are employed, it is desired to avoid possibly detrimental effects upon them and their lubricant, due to causing the balls or rollers to act as current-carrying bridges between the inner and outer races. Accordingly, I prefer to short-circuit the path or paths formed by these bearings and for that purpose I prefer a construction shown in Figure 3.

In Figure 3 the lowermost end of the tubular support 51 is provided with a member 93 preferably of cast nickel-iron formed on or secured to it in any suitable way, as, for example, by utilizing the central passageway 51ᵃ to receive a stud-like extension of the member 93, and pinning or otherwise securing the two together; member 93 is disk-shaped and on its under face is recessed so as to provide a peripheral retainer wall 93ᵃ which is concentric with the axis of the tubular support 51.

In the bottom end of the motor casing 88, as viewed in Figure 3, there is provided a portion 94 also recessed to provide a peripheral wall 94ᵃ which in course of assembly of the parts becomes juxtaposed to the peripheral wall 93ᵃ of member 93, a relatively large metal ball 95 being interposed between the two and being preferably of slightly less diameter than the spacing between the contiguous faces of the recessed members 93 and 94. The ball 95 is held against dropping out by the companion peripheral wall members 93ᵃ and 94ᵃ whose inside faces are preferably inclined to form a suitable angle and to permit the ball 95 to be positioned tangentially to both.

Accordingly, as the motor rotates the ball 95 is propelled centrifugally into tangential contact with the inclined faces of the wall members 93ᵃ and 94ᵃ where, in rolling contact it revolves about the motor axis at about half the R. P. M. of the motor. Thus, the ball acts as a good contact-making bridge between the rotating parts and the stationary parts, assures dependable completion of the high tension circuit to ground and at the same time relieves the bearings from conducting appreciable current.

Electrodes 72 are preferably arranged and constructed to be mounted or supported in groups, preferably in groups of as many electrodes as there are vertically displaced rows of electrodes, namely, three in the illustrative embodiment. In Figures 5, 6 and 7 is shown such a group mounting or assembly. It preferably comprises a support 98 of moldable solid dielectric material preferably of low dielectric loss factor, of the general configuration shown in these figures, to provide a horizontal ledge 98ᵃ just above an inclined edge 98ᵇ from which project cylindrical portions 98ᶜ, one for each electrode, and each having an electrode 72 molded into it along its axis. The electrodes 72 may comprise a cylindrical wire-like member of a diameter approximately one-eighth of an inch, being preferably made of nickel, and projecting beyond the end faces of the cylindrical extensions 98ᶜ to an appropriate extent as indicated in Figure 6.

The wire-like material of the electrodes extends inwardly into the main body portion 98ᵈ of the member 98, the several wire-like members 72 being appropriately bent or conformed, as is better shown in Figure 6, to extend upwardly along and within the main body part 98ᵈ, in spaced relation so as to be insulated from each other, being thence extended substantially horizontally to be exposed respectively in cylindrical recesses 98ᵉ in the left-hand vertical edge 98ᶠ of the member 98, the exposed ends 72ᵃ being threaded as shown in Figure 6. These wire-like parts are molded as inserts within the member 98.

Referring now to Figure 3, the frusto-conical insulating member or support 66 is provided with or has molded into it a series of holes arranged according to the desired distribution of the electrodes 72; thus, in the illustrative embodiment, the holes are alined in three vertically spaced circles, being in number seventy-two holes per circle, and they are also alined vertically to form in effect vertical rows or groups corresponding to the grouping of the electrodes 72 in the supporting member 98 of Figures 5, 6 and 7. For each such vertical row of holes in the member 66 I provide one electrode assembly or mounting 98, and in the illustrative embodiment I therefore employ seventy-two members 98.

These are positioned, as is better shown in Figure 3, with the inclined edge 98ᵇ of each substantially parallel to the inner inclined face of the support 66, the solid dielectric cylindrical extensions 98ᶜ with the protruding electrodes 72 of each being entered into the holes of a vertical row of holes in member 66, thus to bring the electrodes 72 into juxtaposition and alinement with the companion electrode 73, suitable washer-like sealing elements 100 (Figure 3) being slipped over the cylindrical extensions 98ᶜ, thus also to form an effective seal in the event that there is any looseness or play in the fitting of the cylindrical extensions 98ᶜ in their respective holes.

Each electrode mounting member 98 is provided with a horizontally extended lug 98ᵍ at its upper end and with a downwardly extended lug 98ʰ at its lower end (Figure 6) and as each member 98 is assembled to the frusto-conical dielectric support 66, as above-described, lugs 98ᵍ and 98ʰ are brought into abutting relationship respectively with the inner cylindrical face or edge 38ᵃ of the ring member 38 and with the inner cylindrical face of an annular flange 65ᵃ formed in the flange 65; by these cylindrical edges or faces, all of the members 98 are neatly alined to form an annulus, as better appears in Figures 3 and 2, and thereby also the ends of the electrodes 72 become accurately alined with each other and with the inner surface 74 of the electrode member 73 and non-uniformity of spark gap length avoided.

Into each recess 98ᵉ of the members 98 is received a connector which preferably takes the form of that shown in Figures 8 and 3 at 101. It comprises a metallic tube 102 covered with a suitable solid dielectric material 103 preferably molded thereon, one end of the tube 102 being internally threaded as at 104 (Figure 8) so that threaded connection may be made with the threaded ends 72ᵃ of the wire member 72 exposed in the recess 98ᵉ of the member 98. The solid dielectric material 103 (Figure 8) that extends about the metal tube 102 is at its right-hand end preferably of a diameter to fit snugly into the cylindrical recess 98e of the member 98.

The connector elements 101 may thus be easily assembled to the members 98 but this is preferably done after the latter have been set in place as above described and as is shown in Figures 2 and 3, the vertical rib of the angle-cross-sectioned ring member 38 being provided with suitable apertures or being broken away at appropriate intervals as at 38b (Figure 3) to permit the connector members 101 to be entered therethrough and into the recesses 98e of the members 98, the connector elements 101 thus projecting radially outwardly beyond the supporting ring 38 and toward the cylindrical wall portion 30 of the casing; this they do in vertically displaced layers, ilustratively three, as is better shown in Figure 3. The connector members 101 are also preferably of differing lengths in order to facilitate a more compact arrangement of other parts and of the electrical connections, about to be described, for effecting energization of the spark gaps.

In this latter connection I prefer to effect energization of the spark gap circuits in such a way that I am enabled to prevent excessive flow of electrical energy and hence prevent the dissipation, with possible detrimental or destructive results, of excessive energy in the spark gaps or in any one of them. For example, an excessive or too heavy energy dissipation in a spark gap or in the spark gaps might carbonize or burn the flour.

Where, as in the illustrative embodiment being described, I utilize a single source of high potential for energizing the electrode circuits, such as a step-up transformer, indicated generally in Figure 3 by the reference character 106, I prefer to provide each electrode circuit with suitable protective or energy-limiting means. Thus, the transformer 106 may be of any suitable construction and is preferably positioned, as shown in Figures 1 and 3, substantially underneath the bottom wall portions 26—27 of the casing, and by this arrangement, with one side of its high voltage winding grounded and the other led to a suitable high voltage terminal insulator 107 (Figure 3) of any suitable construction, the terminal insulator 107 may be made to enter the interior of the casing through the bottom portion thereof, at a suitable point preferably such as is indicated in Figures 3 and 9. The transformer 106 may be connected to any suitable source of relatively low voltage energy through terminals 108 (Figure 3).

From the high voltage terminal 107 the high voltage electrodes 72 are energized and the protective or energy-limiting means above-mentioned preferably comprises a capacitor, but in the manner used is better termed an elastor. Preferably, there is one elastor for each electrode circuit, conveniently taking the form of that shown in Figure 4 and generally indicated by the reference character 109. The device 109 comprises a sealed tube or envelope 110 of solid dielectric material, such as "Pyrex" glass, and it contains a gaseous dielectric medium, illustratively neon, at a pressure of about 50 millimeters. Its left end portion is exteriorly covered with a conductive coating 111 and a coating 112 extends over its right-hand external portion.

The coatings 111, 112 may be applied in any suitable way, preferably by spraying a suitable metal onto the tube surfaces. Also, they are preferably arranged to permit electrical connection to be made thereto conveniently. Thus, metal covering 111 is provided with two cylindrical band portions 111a and 111b, spaced from each other as shown in Figure 4, while covering 112 is provided with a cylindrical band portion 112a preferably of reduced diameter and hence preferably sprayed onto a restricted extension of the tube 110. One such device 109 is provided for each electrode circuit and I arrange them concentrically with the central vertical axis of the apparatus and in the generally annular space between the cylindrical casing portion 30 and the upper portion of the member 28.

Members 109 I also preferably mount so as to be easily replaceable. And referring to Figures 3, 9 and 2, I provide a metal annulus 115 having therein holes 116 corresponding to the number of devices 109 and equalling in number the number of electrodes 72; the holes 116 are arranged in circular and radial groups (Figures 9 and 2). Thus, they may be arranged in six circular groups to permit staggering of the radial groups and hence to achieve better compactness of arrangement, while the radial groups are in number the same as the number of electrode supports 98. Where the latter have three electrodes and hence three connecting devices 101, each radial row (Figures 9 and 2) has three holes 116 and each radial row is alined under the radius of an electrode support 98, as is better shown in Figure 2.

The thus apertured annular support 115 is supported concentrically in the annular space within the casing portion 30 (Figure 3) in a position spaced upwardly from the casing bottom 26—27, preferably by upstanding rod-like insulators 118 (Figure 3), one for each of the four standards or legs 25, by which they are directly supported. The legs 25 being preferably tubular, are openended within the casing structure and thus facilitate mounting of the insulating supports 118 thereto, preferably with a vibration damper interposed, preferably of conventional construction embodying rubber in shear. Thus, a rubber annulus 120 is bonded to concentric metallic tubes, the outer of which seats in the upper end of leg 25, being thereby grounded thereto, and the inner of which, grounded to leg 25 by conductor 119a, receives the lower end of a cup-like member 119 in which is seated the lower end of the support 118.

The annular support 115 has suitable means for engaging the upper ends of the insulating supports 118 and they may comprise socket-like brackets 121 (Figure 3) suitably secured to the support 115 and shaped to take over the upper ends of the insulating supports 118.

The annular support 115 is connected as by a conductor 122 (Figures 3 and 9) to the high voltage side of the transformer 106 and hence to the connecting element of the insulating terminal 107, thus maintaining the support 115 at high potential. In each aperture 116 is secured a metallic tube-like member 123, closed at its lower end as shown in Figure 3, and of an internal diameter and of a length or depth appropriate to receive the left-hand end (Figure 4) portion of the elastor 109, thus bringing the band portions 111a and 111b into snug engagement with lower and upper portions respectively of the internal cylindrical walls of the tube support 123, and also effecting electrical connection therebetween. Preferably, a suitable cushioning material 124 such as metallic wool, is placed in the bottom of each socket-like member 123 against which the lower end of the elastor 109 may rest.

Spaced upwardly from the annular support 115 is an annulus 126 of solid dielectric material, such as Bakelite, provided with holes 128 so distributed that they register respectively with the upper open ends of the tube or socket members 123 (Figures 3 and 9); insulating member 126 is held spaced upwardly from the socket-holding annulus 115 by any suitable means, such as studs or pillars 129 (Figure 3) made preferably of solid dielectric material and acting also to hold member 126 against movement relative to the member 115 so as to maintain the openings in both in registry.

Also, as shown in Figure 3 the tube or socket members 123 are preferably of a depth sufficient to accommodate so much of the elastors 109 as is commensurate with the extent of the outer metal covering 111, the upper ends of the elastors 109, with their coverings 110 extending upwardly to terminate in a plane somewhat below the space into which the connector elements 101 project, insulating annulus 126 being supported at such a height as to fall in a plane substantially midway of the two planes in which the adjacent ends of the coatings 110, 111 of the elastors 109 respectively fall.

Thus, the reduced-diametered ends 112ª (Figure 4) of the elastors 109 are all presented upwardly just underneath the insulated connectors 101. By means of a spring or resilient metal cap 130 (Figure 3) which can be snapped or forced onto the reduced end 112ª of the elastor 109 and which has connected to it a bare wire 131, the coating 112 of each elastor 109 is electrically connected to a connector 101 and this connection may be quickly and simply effected by simply inserting the free end of the wire 131 into the outer open end of the tube 102 (Figure 8) of the connector element 101.

With the holes and tube or socket members arranged as above described (see Figures 2 and 9) and with the elastors 109 set into place therein, the elastors become arranged in radial rows of three each, with each row alined with the vertical or radial plane of the connectors 101 projecting outwardly from each electrode support 98. With this arrangement the innermost elastor 109 of any one radial group is connected by a wire 131 to the lowermost connector 101 of the group carried by the electrode support 98, the intermediate elastor is connected to the intermediate connector 101 and the outermost elastor connected to the uppermost connector 101, and for this purpose, and as shown in Figure 3, the connectors 101 are preferably of progressively varying lengths so as to terminate substantially immediately above the elastors to which they are respectively to be connected.

With the annular support 115 and the tube or socket members 123 maintained at high potential, as above described, the metal coatings 111 of the elastors 109 are likewise maintained at the same potential, relative to other parts of the apparatus. The gaseous content, illustratively neon, of the elastors 109, being subjected to a relatively high dielectric field or stress, becomes conductive and forms with the metal covering 111 the two elements of a capacitor with the intervening wall of the glass tube or envelope 110 as the intervening dielectric. With the illustrative numerical or dimensional values as above set forth, the capacitance of this capacitor is on the order of 250 micro-microfarads.

But at the other end of each elastor 109, a similar capacitor structure and action exist in that the conductive gaseous medium within the envelope 110 and the other outer covering 112 form the conductive or electrode parts of another capacitor with the intervening wall of the envelope as its dielectric, and in capacitance it is preferably the same as the other capacitor.

But these two capacitors will be seen, by the construction, to be in series, and hence give an effective capacitance of half the value of each and hence a capacitance of 125 micro-microfarads.

Accordingly, the circuit of each electrode 72 has included in it such an elastor and thereby the current flow in each circuit is definitely limited to a safe value, a value which, if materially exceeded, might give rise, as earlier above pointed out, to dissipation of so great an amount of energy in the spark gap as might carbonize or burn the flour, or bring about undesirable effects.

Should the envelope 110 of an elastor 109 become punctured or otherwise break down, the ingress of air into the envelope at atmospheric pressure makes the device non-conductive and current flow through the circuit of the punctured elastor ceases.

Should the puncture be minute and of such a character as to short-circuit or destroy the capacitor action of one of the two capacitors of each elastor 109, the capacitance of the remaining capacitor remains in the circuit and with the effective capacitance in that particular circuit now approximately doubled, the energy flow in that circuit still cannot exceed about twice its original value, the factor of safety being selected to permit even such a doubling of the energy to take place but air at atmospheric pressure ultimately fills the envelope of the elastor even if the puncture is minute, and that particular circuit becomes ineffective since the elastor than becomes non-conductive.

Should such a rupture of the envelope of an elastor 109 take place as would cause a shattering or breakage of it in such a way as to permit its upper part with the metal coating 112 or a part thereof to move downwardly, the insulating annulus 126 stops such downward movement and thus prevents a direct closure of the discharge electrode circuit such as would take place if the metallic high potential supporting annulus 115 were contacted by the downwardly moving conductive coating 112.

Thus, limitation of the energy flow is dependably achieved and risk of giving rise to a dangerous operating condition negatived.

It will be noted that the annular spacing, as viewed in Figures 2 and 9, in which the elastors 109 are accommodated, as above described, is well within the annulus defined by the outer circumference of the frame ring 38 and the inner circumference of the flange 30ª of the cylindrical side wall portion 30 of the casing, thus to permit the elastors 109 to be freely withdrawn or inserted from above. For this purpose, I provide, in the casing structure, suitable means for achieving ready access and such means preferably takes the form of a hand hole 133 shaped as shown in Figure 2, being in general arcuate and of arcuate and radial extents sufficient to encompass within its area, when projected downwardly, as seen in Figure 2, a convenient or suitable number of elastors. Hand hole 133 is provided with a cover plate 134 (Figure 1) having any suitable means, such as screws, for readily detaching it and thus exposing the hand hole 133.

As earlier described, the cover plate 31, also annular in shape (see Figure 2) is preferably secured peripherally to the flange 30ª (Figure 3) as by screws 44. Accordingly, when access to the interior is desired, for example, to replace an elastor, the screws 44 are removed, leaving the top plate 31 resting at its outer periphery on the flange 30ª (Figure 3) and with its inner periphery in the rabbet 42 of the collar or ring 41. With the cover 134 of the hand hole 133 removed, the top plate 31 may now be swung about the central vertical axis of the apparatus to bring the hand hole 133 over that group of elastors in which is included the elastor to be replaced.

Replacement through the hand hole is quick and easy; the connector elements 101, after the connecting wires 131 are withdrawn therefrom, may be quickly unscrewed from the electrode supports 98, where necessary, thus to clear the path for upward withdrawal movement of the elastor in question and for insertion of a new one, whence restoration of the parts proceeds with the same facility.

In Figure 2 it will be noted that I prefer also to provide a hand hole 135 spaced inwardly of the hand hole 133 and also covered by a detachable cover plate 134 (Figure 1). Hand hole 135 is of an expanse and location such that it falls over part of the annulus formed by the upper horizontal lugs 98ᵍ of the electrode supporting members 98 (Figures 6, 3 and 2), whereby ready access to the latter for replacement may be achieved, as is better seen in Figures 2 and 3.

Accordingly, through the hand hole 135 with the cover plate 134 removed, access to any of the members 98 may be readily gained, as, for example, for purposes of replacement, the electrical connections and connectors being removed through the hand hole 133. To facilitate handling of the members 98 through the hand hole 135, I prefer to provide each with a lug 98ʲ (see Figures 6, 7 and 3) apertured as at 98ᵏ.

With all of the members 98 fitted in position as above described and as shown in Figures 2 and 3, the lugs 98ʲ are alined about the inner face of the annulus which the members 98 make up in the aggregate, with the holes 98ᵏ exposed upwardly in these lugs. Accordingly, a rod, or the like, may be used and extended through the hand hole 135 and with its end passed into or through the hole 98ᵏ of the lug of a member 98, the latter may be manipulated to release it from its interfitted position or relation with respect to the coacting supporting and alining parts.

More specifically, the member 98 (see Figure 3) may in this manner be more easily given a movement inwardly toward the central axis of the apparatus, thus to withdraw the cylindrical portions 98ᶜ thereof from the holes in the insulating support 66, whence the member may be withdrawn upwardly through the hand hole 135. For example, the abovementioned rod may be passed completely through the hole in the lug to bring its lower end to bear against the wall of annular groove 140 which may thus act as a fulcrum for the rod and whereby the member 98 may be moved inwardly to withdraw its parts from the member 66.

Thus, servicing or maintenance of the apparatus may be easily and conveniently maintained. In this connection, it might also be noted that the moving parts are few in number and are simple and that, with their rugged mounting, they are well adapted for long continued operation.

About the periphery of collar 63 are provided air impeller blades 63ª (Figure 3) effective to impel air downwardly through the annular passageway between the uppermost external cylindrical surface of sleeve shaft 61 and the vertical wall of counterbored portion 49ª of hub 49, thus to prevent ingress of flour to the bearings and other parts internally of the sleeve shaft 61. A passage or channel 138 provided in the parts 48 and 41 and connected to an external conduit 139 supplies air to the impeller blades 63ª for the above purpose.

Figure 11:
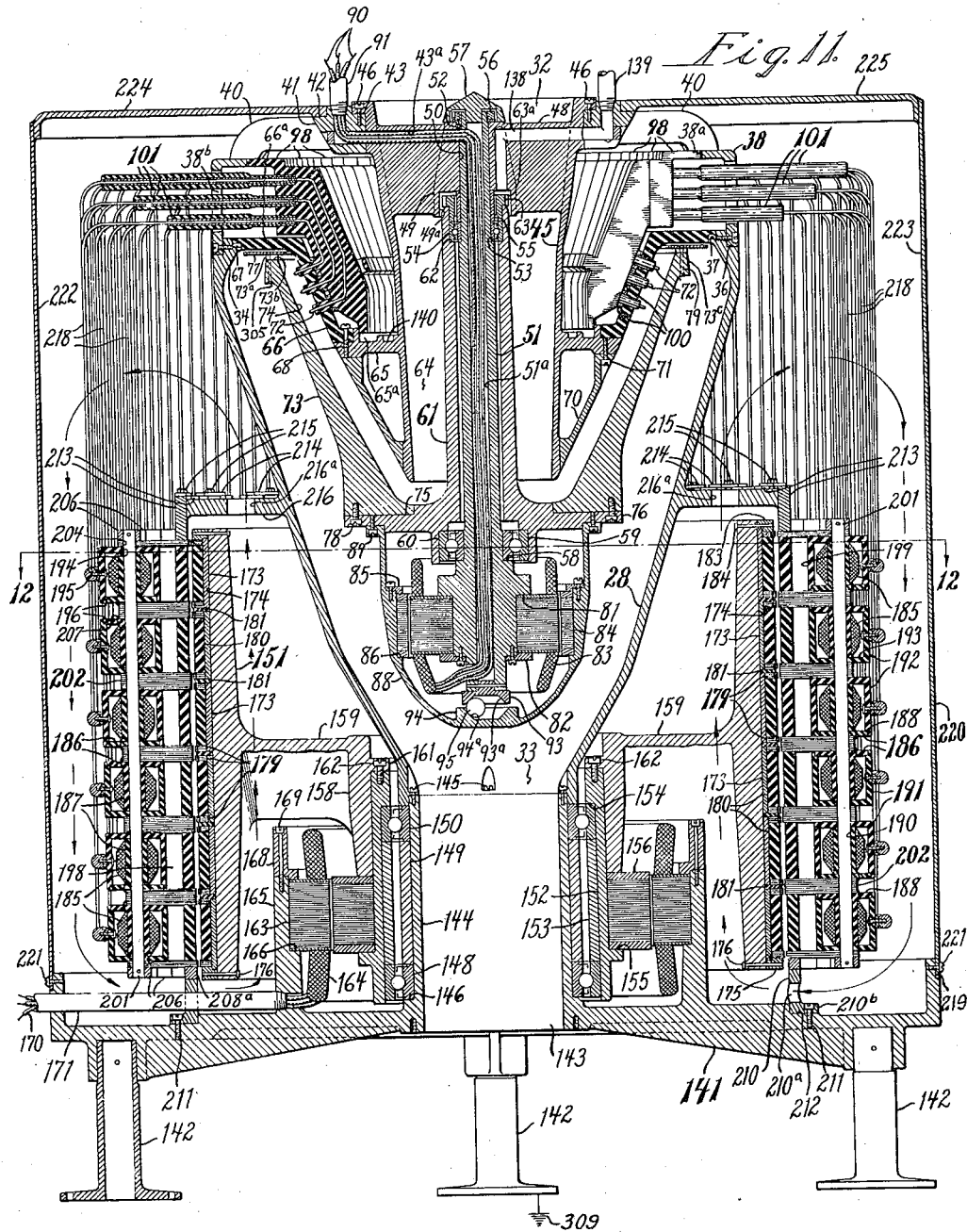
Figure 11 is a vertical sectional view, like that of Figure 3, of another form of apparatus.

In Figures 11-20, I have shown an apparatus and arrangement for otherwise achieving energization of the electrodes and for limiting the energy of discharge to a safe value. In this form of apparatus I provide a disk-like base plate or casing bottom 141 (Figure 11) preferably supported at a suitable height above the floor as by standards or legs 142 which, like the legs 25 of Figure 3, may be four in number and equiangularly displaced about the central vertical axis of the apparatus. The bottom frame 141 has at its center and along the vertical axis of the apparatus an exit opening 143 to which, like the opening 33 of Figure 3, connection may be made as by a pipe or conduit to pass the treated product away from the apparatus. Surrounding this opening and preferably integrally formed with the bottom frame 141 is an upwardly extending sleeve 144 which at its upper end is received into the lower end or opening 33 of the member 28, being secured thereto by suitable screws 145, as shown in Figure 11.

The member 28 coacts with parts similar to those described in connection with Figures 1-9 and these parts are hence designated by the same reference characters, their functioning and coactions being now clear from what is set forth above in connection with Figures 1-9.

The lower outer face of the frame sleeve 144 (Figure 11) is shouldered as at 146 to receive the inner race of an anti-friction bearing 148, and slipped onto member 144 and abutting against this inner race is a spacer sleeve 149 against the upper end of which rests the inner race of an anti-friction bearing 150. The parts are so diametered that the lowermost end of the member 28 slips over the upper end of the frame sleeve 144 to rest against the inner race of bearing 150, the weight of the parts, supplemented by the securing action of the screws 145, thus insuring maintenance of dependable assembly of these parts and particularly of the bearings 148 and 150 in spaced relation.

The bearings 148 and 150 are preferably combined radial and thrust bearings and the outer races thereof support, for rotation about the central vertical axis of the apparatus, a cylindrical part 151 which I shall hereinafter for convenience term a "rotary frame" and which, as is later described, carries and moves the moving parts of electric generator means that coact in a peculiar and unique way with the electrodes of the apparatus. This rotary frame 151 may be driven in any suitable manner but preferably in the manner about to be described, certain features of the mounting of member 151 being preferably made to take part in this preferred form of drive.

Thus, I provide a sleeve 152 diametered to be received over the outer races of bearings 148 and 150 with a spacer sleeve 153 (Figure 11) between the later, sleeve 152 being shouldered as at 154 to transmit any downward thrust to the inner race of bearing 150 and through the spacer sleeve 149 to the inner race of bearing 148.

Near its lower end the sleeve 152 has a shoulder 155 against which the laminations of a rotor 156, with its clamping plates, rests, being clamped against the shoulder 155 by a sleeve-like hub 158 of the rotary frame 151 to which the hub 158 is connected by integrally formed radially extending ribs 159. The ribs 159 are of suitable number, illustratively four as shown in Figure 12, and the latter preferably have surfaces 160 (Figure 12) of suitable expanse, curvature and inclination, to function, when rotating in clockwise direction, as viewed in Figure 12, as a fan or air impeller to move air upwardly, as viewed in Figure 11, and for a purpose later described.

The sleeve-like hub 158 fits over the sleeve member 152 and at its lower end engages the upper face of the rotor structure 156; at its upper end it has an internal shoulder or flange 161 which takes against the upper end of the sleeve 152 to which it is secured as by screws 162. The rotary frame 151 may thus freely rotate about the central vertical axis of the apparatus, as does also, by the same mounting, the rotor 156.

A suitable stator or field structure comprising an iron core or laminations 163 and energizing windings 164 (Figure 11) extends about the rotor 156, being supported by an upstanding annular flange 165 preferably formed integrally with the bottom frame 141 and provided with an internal shoulder 166 against which the core structure 163 rests and against which it is clamped by a clamping ring 168 (Figures 11 and 12) which is secured to the flange 165 as by screws 169.

The stator or field windings 164 are energized from any suitable source of electrical energy, preferably alternating, connection being made by way of conductors 170 (Figure 11) carried to the exterior of the apparatus by means preferably of a suitable conduit or pipe 171 which, as shown in Figure 11, may be threaded into the stator-supporting ring or flange 165. When suitably energized, therefore, the rotor 156 is set into rotation and with it the rotary frame 151.

The rotation of the rotary frame 151 I utilize in coaction with other parts to effect the generation of electrical energy in suitable form for energizing the discharge electrode circuits and I preferably utilize and provide a separate generator for each electrode circuit and preferably a generator having the characteristic of being incapable, under given conditions of operation, of supplying energy beyond a certain magnitude or value. Accordingly, in this illustrative form, where I employ three circular rows of electrodes 72 with 72 electrodes in each row, thus totalling 216 electrodes and electrode circuits, I provide 216 generators, one for each electrode circuit. These generators are preferably of a very simple and inexpensive form and construction and the moving parts thereof I mount on the rotary frame 151; for convenience in assembly and compactness of arrangement, I may arrange these generators in any suitable number of circular rows or series, one above the other, and illustratively I may, as shown in Figures 11 and 12, provide six circular rows or series, one above the other, with 36 generators in each series. Of the two principal elements of these generators, one of them is carried by the rotary frame 151 and the other is suitably positioned and mounted to coact therewith.

In the illustrative form, the element which I prefer to mount on the rotary frame 151 is the field-producing element and preferably takes the form of a permanent magnet and hence comprising a suitable metal or alloy appropriately treated and permanently magnetized. It may, therefore, be given a simple and inexpensive conformation or shape, such as a plain bar of rectangular shape and cross-section, as shown at 173 in Figures 11 and 12. The rotary frame 151 I preferably provide in its outer cylindrical face with vertically extending T-slots 174 (Figures 11 and 12), and where 36 generating units are to be arranged in one circular series, these T-slots 174 are 36 in number and in length they are sufficient to accommodate in each as many permanent magnet field bars as there are to be series of generating units, illustratively six. Thus, in Figure 11, six magnet bars 173 are shown accommodated in each of the two T-slots that appear in that cross-section, the lower ends of the T-slots being closed in any suitable manner as by a ring 175 suitably secured as by pins 176 to the lower end of the rotary frame 151. Adjacent ends of the magnet bars and their pole pieces are preferably separated by a suitable thickness of a yieldable non-metallic means, such as paper, as at 181, and of configuration to fit T-slot 174, to provide ample leeway for relative differences between the temperature coefficients of expansion of the materials of the field construction and of the material of the rotary frame 151, the latter being illustratively made of aluminum.

As better appears from Figure 12, the magnet bars 173 preferably do not completely fill the base portion of their respective T-slots 174, thus leaving a T-shaped space for the reception of certain T-shaped parts.

The latter comprise pole-pieces 179 and spacers 180 and 181 (Figure 11); the pole-pieces 179 are preferably laminated and shaped as shown in Figure 16, being provided with any suitable form of amortisseur winding, as indicated by damper bars 182 and plates 182ª to damp out the effects of the pulsating armature reaction. The spacer member 180, like the pole-pieces 179, is also T-shaped and similarly dimensioned as to cross-section to fit snugly into so much of the T-slots 174 as is not occupied by the magnet bars 173, and in Figure 17 spacer 180 is shown in perspective. Spacer 180, moreover, is made of a suitable non-magnetic material and preferably of a solid dielectric like moldable Bakelite.

In assembly, therefore, and viewing Figure 11, the pole-pieces 179, the long spacers 180 are inserted into those outward portions of the T-slots 174 not occupied by the magnet bars 173 in appropriate sequence, as shown in Figure 11, so that two pole-pieces 179 become positioned adjacent the respective ends of each permanent magnet field piece 173, the long spacer 180 determining the spacing therebetween, and so that a short spacer 181 becomes interposed between the two pole-pieces and the adjacent ends of two successive magnet bars. Preferably, the parts are relatively tightly fitted into the slots so as to insure rigidity and immovability of mounting or assembly, and the upper open ends of the slots 174 are closed in any suitable manner as, for example, by a ring 183, companion to the ring 175, and secured in any suitable manner to the upper end of the rotary frame 151, as by pins 184 (Figure 11).

Thus, there are provided six ring-like series of generator field structures, each comprising a permanently magnetized field piece with two pole-pieces, the resultant pairs of pole-pieces 179 being in each series equi-distantly or equi-angularly spaced about the periphery of the rotary frame member 151. The pole-pieces may project slightly from the peripheral or cylindrical face of member 151 while the outer faces of the spacers 180 and 181 are preferably flush with the outer cylindrical face of member 151.

For each field structure, which will thus be seen to be substantially U-shaped (see Figure 11) I provide a mating or companion U-shaped core of magnetic material, preferably laminated, with a winding for each, and to simplify manufacture and assembly I preferably employ a construction as follows:

Thus, referring first to Figure 11, there is there shown such a winding, as above mentioned, at 185, which may be form wound to be received on, or may be directly wound upon, a winding support 186, better shown in Figure 14 as comprising a cylindrical sleeve 187 for directly receiving the winding and an end disk 188, provided with a hole 189 through which one end of the winding 185 may be drawn for subsequent electrical connection; the sleeve 187 has an axially extending aperture 190 of cruciform shape matching the cross-section of a core member later described.

Companion to the winding support 186 is a housing member generally indicated at 191 and better shown in Figure 13; like the support 186, it is preferably made of solid dielectric material of low dielectric loss factor like moldable polymerized styrene. It comprises a cylindrical casing portion 192 closed at one end by a disk-like end wall 193 having at its center a cruciform aperture 194. In its cylinder wall it has mounted an electrical connecting device 195 (Figures 11, 12 and 13), comprising a tubular stud with external lock nut and an external spherical member screw threaded to fit the stud portion and to receive conductor 218 as shown in Figures 11 and 13.

As the winding on its support 186 is inserted into housing part 191 the wire of the high voltage end of winding is pulled through the tubular stud. When winding is finally positioned in housing 191, by means of rabbet 196 which forms a seat for the disk part 188 of support 186, the wire is soldered to external end of the stud and the excess wire cut off. The spherical member of 195 is then screwed on the stud member.

Housing member 191 has a radial extension 198 preferably of the same axial length as that of the cylindrical housing part 192, being hollowed out, if desired, as at 199. On its two parallel axially extending faces, the extension 198 is provided with grooves 200 that extend parallel to each other and parallel to the axis of the winding housing and of the cruciform registering core apertures 190—194.

Where several vertically displaced series of generator units are to be provided, I may and preferably do arrange the stationary elements thereof in vertical rows, just as the permanent field magnet bars 173 (Figure 11) with their respective pole-pieces are arranged in vertical rows, and where six vertically displaced series of units are to be provided, each of these rows contains six elements; accordingly, as shown in Figure 11 each vertical row of stationary elements comprises six windings 185 each with its housing-like support 186—191, arranged with their cruciform apertures 190 in alinement to facilitate reception of, and axial alinement by, a core piece 201 which, being preferably laminated and preferably cruciform in cross-section, thus snugly receives the cruciform apertures 190—194 of these winding housings.

But also strung onto the core piece 201 and in suitable order or sequence with the winding housing units are core pieces 202, being shaped substantially as shown in Figure 15 and hence having an aperture 204 of cruciform shape at one end and opposed recesses or grooves 205 dimensioned and spaced to match the grooves 200—200 of the part 191 of Figure 13. The pole-pieces 202 are preferably laminated and hence comprise a suitable number of pieces of dynamo steel, or the like, each shaped as is shown in Figure 15.

The axial length or dimension of the winding housing unit 186—191 is the same as the length of the spacer members 180 (Figure 11) that determine the spacings between the pole-pieces 179 of the permanent magnet bars 173. The core pieces 202 match in thickness two pole-pieces 179 and a spacer 181.

Accordingly, when these parts are strung onto the long cruciform cross-sectioned core piece 201 in the sequence shown in Figure 11, they become alined to each other so that the opposed grooves 200—200 of the housing parts 186—191 and the opposed grooves 205—205 of the pole-pieces 202 become respectively alined with each other and form two continuous opposed grooves, the interfitting of the core piece 201 with the apertures of these several members bringing these parts into proper alinement to register these grooves. That end of each winding 185, that is brought out through the hole 189 (see Figure 14) in the end disk 188 is, in course of this assembly, grounded to the apparatus in any suitable way as, for example, to the core pieces 202, as indicated at 207 in Figure 11. Suitable means, such as end collars 206, fitted onto the respective ends of the core piece 201 and secured thereto in any suitable way, hold all of these parts assembled to form a single sub-assembly having, for each winding 185, an individual U-shaped core structure, each comprising a portion of the core piece 201 and two core pieces 202, the ends of the latter being spaced to match the spacing of the pole-pieces 179 of the field magnet 173.

In the illustrative example, 36 such sub-assemblies are built up and then grouped concentrically about the cylindrical frame member 151 for coaction with the field core structures carried by the latter, these sub-assemblies being preferably uniformly spaced from each other in any suitable way. Preferably, I utilize the registering opposed grooves 200—205 to take part in this action and thus I may provide vertically extending members 208 each provided with tongues 209 (see Figure 12) in its opposed edge faces for interfitting engagement with the alined grooves 200—205 of the sub-assemblies. The sub-assemblies and these tongued members 208, when thus alternated with each other, bring about such alinement of the faces of the core members 202 as to make the latter coincide with a cylindrical surface whose radius is but slightly greater than the cylindrical surface in which the faces of the pole-pieces 179 on the rotary frame 151 terminate, the difference in these two radii being the desired magnitude of the air gap between the stationary and moving parts of the magnetic circuit of any generator unit of all of the series.

The members 208 are formed, by slotting, from the integral coaxial cylindrical part 210 of frustoconical member 28. This cylindrical part 210 depends from annular flange 216 of casting 28, and terminates in a flanged portion 210b. This flange 210b is positioned on casing bottom 141 by rabbet 212 formed thereon and is fastened by screws 211.

As the bottom of each slot formed between members 208 is semicircular, due to the action of the slot cutting tool, semicircular inserts 208a are therefore provided to form horizontal bases for the lowermost of the core legs 202, as indicated in Figure 11.

Non-magnetic grooved spacer members 213 are provided one for each slot. Each of these members, when assembled, extends upwards slightly above the upper surface of annular flange 216, and is forced downwardly by screw 215 and clamping plate 214 atop of each member 208, thus holding a series of core legs 202, radial extensions 198 of coil housings 191, and insert 208a in compression. Holes 216a in member 216, and holes 210a in lower part of member 210 just above flanged portion 210b, are provided for air circulation.

With the assembly thus far completed, there are accordingly presented, alined along an imaginary cylindrical surface, all of the terminal connectors 195 (Figures 11, 12 and 18) of the windings 185, being arranged in 36 equi-angularly spaced rows, and by means of conductors 218 connected to the devices 195, the windings 185 are connected respectively to the connectors 101 and hence to the electrodes 72.

As appears from Figures 11, 12 and 18, the conductors 218, which may be bare wires of appropriate rigidity and of sufficient diameter to prevent corona, are suitably bent to maintain appropriate spacings between each other as they extend upwardly from the connecting devices 195 to the connectors 101. For example, the three conductors from the upper three terminals 195 extend to the three connectors 101, respectively, of one electrode support 98, while the three conductors from the lower three terminal devices 195 extend to the three connectors 101 of the next adjacent electrode support 98, the circumferential spacings between the vertical rows of devices 195, as better appears in Figures 12 and 18, giving adequate space for accommodating these conductors 218 while maintaining adequate spacings therebetween. Thus, each vertical row of generator elements is electrically connected to the connectors of adjacent electrode supports.

With the common electrode and conveyor element 73 (Figure 11) rotating as was described earlier in connection with Figures 1-9, the movement of the flour takes place as was earlier described; with the rotary frame 151 rotating at a suitable speed by energization of the windings 164, the generator units are also in operation and in the illustrative embodiment each generator armature is in the circuit of one electrode 72. During the rotation of the rotary frame 151, all of the field-producing magnet bars 173 in any one circular row or series are, during a single revolution, presented successively into coacting relationship with the core pieces of all of the stationary elements of that series. For any one winding 185 and its U-shaped core structure (202—201—202), the magnetic field is built up and collapsed once for each time that a permanent magnet bar 173 with its pole-pieces 179 is brought into and out of juxtaposition to the core pieces 202—202; for one revolution that happens 36 times and, the speed of drive of the member 151 is therefore selected, in relation, of course, to other factors, to give the desired frequency of alternating E. M. F. generated in the windings 185. An illustrative rate of drive is about 420 R. P. M., hence seven revolutions per second and, with 36 elements in a series, as above assumed, the frequency generated in each winding 185 is accordingly 126 cycles per second, if the magnet permanent bars 173 in the series are, as to their polarity, alternated or reversed end for end throughout, in the manner indicated in Figure 20 where two successive generator units of each of two circular series are shown schematically and where the alternated polar relationships of successive permanent field pieces 173 is also indicated. If these permanently magnetized field pieces 173 are, in any one series, not thus alternated as to polarity but are arranged as is indicated in Figure 19, the frequency of output of any one winding 185 is double that achieved with the arrangement of Figure 20 and in the illustrative embodiment would be about 252 cycles per second. From the comparative arrangements shown in Figures 19 and 20, the manner of inserting the permanent magnet bars 173 in the vertical slots of the rotary frame 151 becomes readily apparent, according to whichever arrangement is adopted.

The magnetization of the permanent magnet bars 173, the cross-sectional dimensions of the various pole-pieces and core parts, and the number of turns in the winding 185 are, with relation to the above-mentioned factors, such as speed of drive, selected so that the output voltage of any one winding or generator armature is, in the illustrative example, about 17 kilovolts, that being the voltage illustratively set forth in connection with the specific dimensional embodiment described in connection with Figures 1 and 9. With that voltage effective upon each electrode 72, the preferred manner of functioning of the apparatus, in so far as concerns movement of the flour and destruction of insect life therein by the electrical discharge from the band-like array of electrodes 72, is substantially as was described in detail in connection with Figures 1-9. But over-energization of any one spark gap in the treatment zone cannot take place due to the fact that the individual generator units have the inherent characteristic that their energy outputs are definitely limited.

The output of one of these generator units is sufficiently small and is inherently limited due to its small size and high internal impedance. The magnetic flux through the armature is limited to that of the permanent magnet 173 less the flux leakage of the magnetic circuit. Illustratively, the current may be arbitrarily limited to a value not exceeding one milliampere, and the voltage as previously mentioned is about 17 kv.

Thus, it is impossible to give rise to such an arc-over or discharge as would damage the flour or cause a dangerous or explosive condition.

The base frame 141 (Figure 11) is upwardly flanged at its periphery and suitably rabbetted as at 219 to interengage with a cylindrical casing structure generally indicated at 220, being detachably secured as by screws 221. The casing structure 220 is preferably constructed to permit of ready access to the apparatus or parts thereof and for this purpose I preferably construct it in sections.

Thus, it may comprise two half-cylindrical side wall portions 222—223 (Figures 11, 12 and 18), respectively surmounted by half-circular top portions 224 and 225 (Figures 11 and 18), respectively secured thereto as by welding. The two portions 224—225 are cut out about their center point to interfit with the rabbet 42 of the frame ring 41 at the top of the apparatus, leaving exposed upwardly the entry opening or passageway 32 in the member 45 for passing the flour into the apparatus.

The two casing sections 222—24 and 223—25 are suitably constructed to permit detachment of one from the other, as by providing the two casing sections with suitable flanges 226 and 227, respectively, through which extends suitable bolts 229 for holding the flanges in abutting relationship and holding the two casing sections together.

Thus, by removing the screws 221 and the bolts 229, either or both sections of the casing 220 may be removed, thus exposing a corresponding portion or all of the apparatus, permitting ready access to the generator units, the electrode mounting units 98, and the intervening connecting devices.

The casing structure 220 preferably also functions as a heat-transferring or heat-dissipating device. Thus, referring to Figures 11 and 12, the vane or blade portions 160 of the spoke-like members 159, as they rotate in clockwise direction, as viewed in Figure 12, maintain a steady circulation of air into contact with the generator units to withdraw heat losses therefrom and into contact with the interior walls of the casing structure 220 through which the heat is dissipated to the atmosphere.

In Figure 11 the path of movement of this cooling medium is indicated by arrows. Thus, the air moves upwardly from the air impellers 160 in a stream of annular cross-section, being guided upwardly by the inner wall of the upper portion of the rotary frame 151 and the outer wall of the lower portion of the frusto-conical member 28, whence it passes through suitable openings 216ª in the flange 216 into the space in which the connecting conductors 218 are accommodated; thence it passes downwardly and substantially envelops the stationary parts of the generating units whose individual structures will be seen (see Figure 12) to provide substantial exposed heat-dissipating areas to expedite the transfer of heat losses to this moving cooling medium.

The cylindrical part 210 is provided in its lower portion with a suitable number of openings 210ª (Figure 11) to permit entry therethrough of the stream of air whence it is guided upwardly to the air impellers 160 by the inner wall of the lower half portion of the rotary frame 151, thus completing the circulating path. The flowing air also sweeps into contact with the annular part 165 which supports the stator 153 and stator windings 164 and it may thus withdraw heat losses from the motor structure.

As the annular current of air circulates, it contacts the various enveloping units and a transfer of heat therefrom to the atmosphere outside of the casing structure is effected. Thus, heat losses in the apparatus may be dissipated and over-heating prevented.

Figure 22:
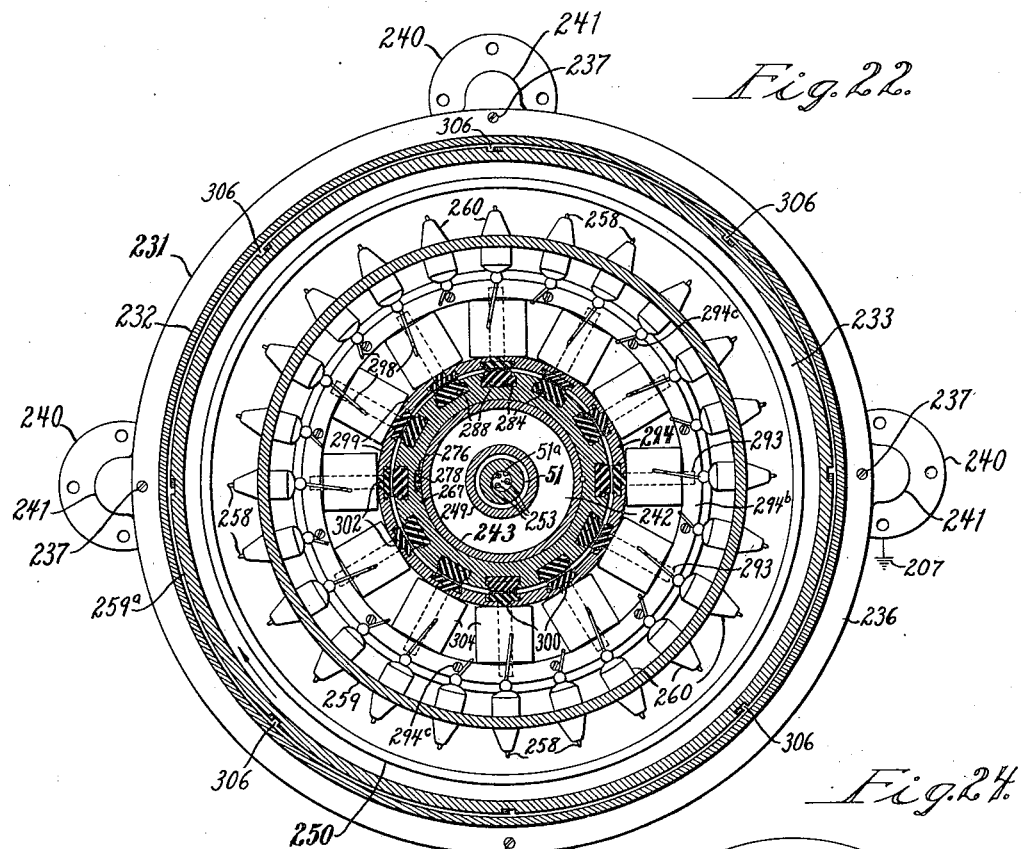
Figure 22 is a horizontal sectional view as seen along the line 22—22 of Figure 21.

Referring now to Figures 21 and 22, I have here shown, by way of illustration, another embodiment of certain of the features of my invention whereby certain of the above-described actions and advantages may be enhanced and certain other advantages gained. Thus, I may provide an outer casing structure, generally indicated by the reference character 231, and comprising, preferably, an upper casing section 232 and a lower casing section 233, each substantially frusto-conical and preferably constructed in any suitable way to snugly interfit and to be detachable one from the other. Thus, the upper periphery of lower section 233 may have a rabbet 234 with which the lower periphery of the upper section 232 interfits to bring suitable flanges 235 and 236 into overlapping relationship for being detachably secured together as by screws 237.

Casing section 233 corresponds substantially to the member 28 of the embodiments of Figures 3 and 11, terminating at its lower end in a discharge opening 239 through which the flour passes out of the apparatus and into a suitable conduit or the like suitably attached thereto.

Suitable means are provided for supporting the casing 231 and these may comprise a suitable number, illustratively four, of equiangularly spaced posts or standards 240 secured in any suitable way to the lower casing section 233 as by being interfitted with suitable sleeve-like socket members 241 spaced about the upper portions of the casing section 233 and preferably formed integrally therewith.

The upper casing section 232 terminates with an internally flanged portion 232ª which is bored to receive a member 243 corresponding generally to the member 45 of Figures 3 and 11; member 243 may be in the form of a casting, generally like a tube or hollow cylinder and like the members 45 may be of substantially uniform diameter with an outward flare adjacent its upper end where it terminates in the rabbeted ring or collar 244 which interfits with and hence rests upon the upper end of the casing section 232, being detachably secured thereto as by screws 245. Member 243 is thus suspended interiorly of the casing 231 with the axes of both coincident.

The upper portion of member 243, like the members 45 of Figures 3 and 11, is formed to provide an inlet opening 242 corresponding to the opening 32 in Figures 3 and 11; and a cross-rib 246 with a central hub portion 248, all for supporting a sleeve shaft 249 similar in construction and mounting to that described as to sleeve shaft 61, in Figures 3 and 11, to support at its lower end for rotation therewith a common electrode and transport member 250 constructed like the members 73 of Figures 3 and 11, member 250 and sleeve shaft 249 being driven by a motor within the casing 251 substantially like the motor within the casing 88 of Figures 3 and 11, including the fan, the air inlet to which is indicated by 252. The conductors 253 that lead to the motor in casing 251 again extend from the motor through channels or passageways, the same as in Figure 3, to be brought out through a channel in the cross-rib 246 but in the form of Figure 21, to be brought into a chamber or space 254 formed in the upper part of the casing structure and provided with a removable cover plate 255 to give access thereto for the making of the wiring connections. A conduit 256 leads the conductors from the power circuit into the chamber 254.

Accordingly, the flour may be entered into the apparatus through the vertical passageway, annular in cross-section, formed by the member 243 and the sleeve shaft 249, and with the motor energized and driving the electrode member 250 at a suitable speed, such as 1150 R. P. M., the flour partakes of a movement upwardly along the inner surface of the rotating electrode 250 in the manner above described in connection with the embodiments of Figures 3 and 11. Adjacent the upper inner surface of the electrode member 250 I provide a suitable number of suitably distributed electrodes 258, again arranging them preferably in a circle and preferably in several circular rows, illustratively two, as shown in Figure 21. Electrodes 258 are preferably mounted to partake of rotary movement about the central vertical axis of the apparatus, and I prefer to mount them in a frusto-conical member 259 preferably made of metal and shaped to be received within the electrode member 250 but with its walls spaced from the walls of the latter. Member 259 is preferably made of metal, such as aluminum, and accordingly the electrodes 258, which preferably pass through suitable holes in the electrode mounting member 259 are suitably insulated therefrom as by an insulator or insulating structure as shown at 260.

Frusto-conical member 259 is suitably mounted for rotation, preferably by way of a construction, as follows: I preferably employ an antifriction bearing mounting for the member 259, suitably related to the downwardly extending part 243 so that rotation of the part 259 takes place about the axis of the part 243. Thus, a collar 261 is fitted about the lower end of part 243 and is suitably shaped to take the inner race of bearing 262. A similar collar 261ª is fitted around the upper part of 243 supporting inner race of upper bearing 264, while a sleeve-like frame ring 263 and a long relatively heavy sleeve 267 is fitted onto the part 243; these three members, in advance of the collar 261, extend upwardly toward the upper end of part 243 and against a shoulder 243ª of the latter. The collar 261ª is suitably shaped or grooved to take the inner race of bearing 264. Both bearings are preferably of the combined radial and thrust type and their mountings are such that the inner races are held against downward movement, a frusto-conical member 265, complementary to the electrode carrying part 259, extending about the lower end of the part 243, being provided with a collar-like portion 265ª that fits the part 243 and is connected to the latter, preferably detachably, as by threads 266. By this arrangement, the collar 261 and sleeve parts 263 and 267 are clamped between shoulder 243ª and part 265ª. Thus, the two bearings are held in spaced relation along the interior support formed by the part 243.

The outer race of the lower bearing 262 is interfitted with a lower internal annular extension 268ª of a part 268 that presents an outer frusto-conical surface complementary to and intervening the parts 265 and 269, being connected to the latter by by screws 269.

The outer race of the upper bearing 264 is interfitted with the inner annular part 270ª of a part 270 that has a horizontal portion 270ᵇ that extends underneath and spaced from the annular barrier part or flange 232ᵇ of the upper casing section 232 (Figure 21), whence it extends downwardly and outwardly by the portion 270ᶜ in substantial parallelism with the frusto-conical wall of the casing portion 232; its lower outer edge is suitably rabbeted or grooved to interfit with the correspondingly shaped upper face of a substantially horizontal extending annular or flange-like portion 259ª of the electrode-carrying member 259, the parts being secured together as by screws 271.

Thus, the electrode-carrying member 259 is dependably connected to and mounted on the outer races of the two bearings, forming a peculiarly shaped annular interior that extends about the relatively heavy mounting sleeve 243. In this interior I prefer to accommodate both the motive means for effecting rotation of the part 259 and the source of energizing current for the electrodes 258, preferably taking the form of generator units of the general type and construction described above in connection with Figures 11–20. The sectional construction of the parts that form this annular enclosed space permits of ready assembly of the various parts of the enclosure itself and of the apparatus contained therein, all in appropriate sequence.

Considering first the motive means for driving the part 259, that preferably comprises, as with the motor constructions heretofore described, the rotating and stationary elements of a suitable form of electric motor, such as an induction motor, and may comprise a stator core 272, preferably laminated and extending about and supported by the fixedly held sleeve part 263, as by a shoulder 273 and a threaded clamping ring 274. Stator core 272 has suitable windings 275, the connecting conductors 276 of which are extended upwardly into the chamber 254 by way of a suitable channel 278 (Figures 21 and 22) in the mounting sleeve 267. In the chamber 254 the conductors are connected to the line wires carried in the conduit 256.

The lower portion of the frusto-conical part 259 is provided with an internal annular flange 280, suitably shouldered as at 281 to receive the motor rotor 282, preferably laminated, a clamping ring 283 secured as by screws to the upper end of the annular part 280 serving to clamp and hold the laminated rotor 282 against the shoulder 281, and concentrically or coaxially with respect to the stator core 272.

With the motor suitably energized, therefore, the electrode carrying part 259 with the part 270 are rotated about the central vertical axis of the apparatus and hence also about the stationary alined sleeve-like parts 261, 263 and 267, of which the part 263 supports fixedly and hence against rotation of the stator structure 272 and 275.

These relative movements of the above-mentioned parts I prefer to utilize also to generate the relatively high voltage energy for effecting disruptive discharge between electrodes 258 and the common electrode member 250, and preferably I utilize generator units substantially like those described above in connection with Figures 11–20 and preferably I house or accommodate them in the annular space above the motor 272—282 (Figure 21).

Thus, the relatively heavy sleeve member 267, like the rotary member 151 of Figures 11 and 12, is provided with a suitable number of axially extending T-shaped slots 284 in which are arranged permanent magnet bars 285 and pole pieces 286 in substantially the same manner as the magnet bars 173 and pole pieces 170 (Figures 11–12) are arranged, placing them in as many circular vertically displaced series or rows as is desired, illustratively two, as shown in Figure 21, thus to expose outwardly about the outer cylindrical surface of the member 267 several series of pairs of pole pieces.

In the preferred arrangement, it is desirable to achieve greater vertical spacings between series than is shown in Figure 11 and hence I prefer to employ solid dielectric spacers 288 between adjacent ends of successive magnet bars 285, the spacers 288 completely filling the T-shaped slots 284 while the spacers 289 between the pole pieces of any pair of pole pieces 285, 285, while also T-shaped like the spacers 180 of Figure 11, share the T-shaped slot with the magnet bars 285.

Suitable means, such as end rings 290, 291, suitably secured at the upper and lower ends respectively of the sleeve member 267, hold these various parts assembled in the slots.

Figure 23:
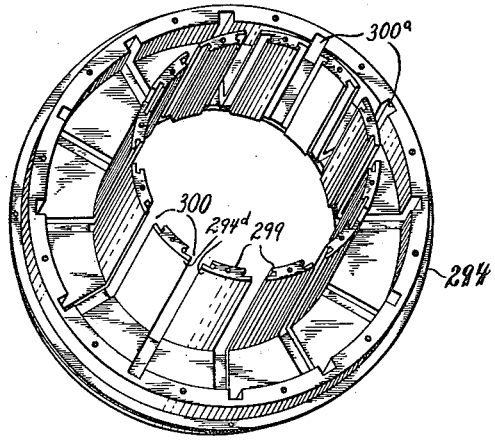
Figure 23 is a perspective view of a mounting part employed in the construction shown in Figures 21 and 22.

Disposed about the resultant assemblage of series of circular rows of pairs of pole pieces I provide, to be rotated with and by the rotating parts 259—270, a suitable number of units each comprising a winding 292 enclosed in a suitable housing 304 of solid dielectric of low dielectric loss factor, and a U-shaped core 293, preferably laminated with the winding about one leg of the core and with the ends of the U-shaped core 293 abutting T-shaped pole pieces 303 spaced the same as the spacing of the pole pieces 286 and of about the same area of face. Such units I arrange in as many circular series vertically displaced as there are series of permanent field elements, hence two in the illustration, supporting the lower series in an annular frame generally indicated at 294 (Figures 21, 22, 23) set into a suitable rabbet 295 provided on the inside face of the electrode carrying member 259 and suitably secured thereto as by screws. A coacting similar annular frame generally indicated at 296 similarly supports the upper series, the angular spacing of the elements in each series being like that indicated in Figure 22 where, for purposes of illustration, 12 such elements are provided in each series. Since the windings 292 extend in this embodiment about one leg of the U-shaped core, successive series are arranged so that the windings 292 of each series are adjacent to each other, the intervening central horizontal plane coinciding substantially with the general plane intermediate of the corresponding two circular series of vertically displaced electrodes 258 which may be staggered with respect to each other so that 24 electrodes 258—260 appear when viewed in plan as in Figure 22; by this arrangement relatively short conductors 298 may be used to connect the high voltage ends of the windings 292 quite directly to the electrodes 258, as clearly appears from the drawings, the other ends of the windings 292 being grounded as was described in connection with Figure 11. Thus, the upper and lower series of winding units 292—293 may be connected, respectively, to the upper and lower series of electrodes 258.

Figure 24:
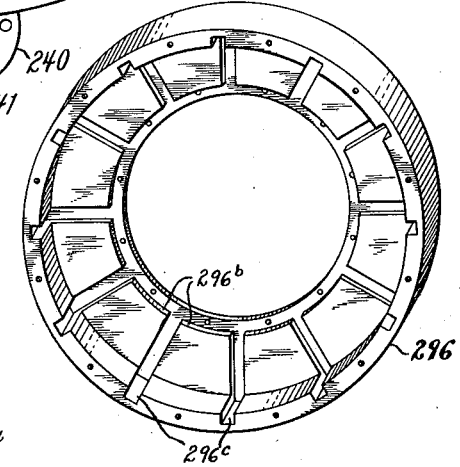
Figure 24 is a perspective view of a mounting member companion to that shown in Figure 23.

The lower frame 294 (Figure 23) coacts with the upper frame 296 (Figure 24) to position and retain the generator armature assemblies. Frame 294 has a horizontal flange and a cylindrical outer wall in which twelve radial slots 300ᵃ are equi-angularly milled. Each slot receives and fits the two legs of a core 293 which are unoccupied by winding and connects with a vertical T-slot 300 formed between upwardly projecting members 299 which are equally spaced about an inner cylindrical wall concentric with the outer cylindrical wall.

The upper frame 296 (Figure 24) also has slots 296ᶜ in its outer cylindrical and horizontal flange portions for the same purpose as slots 300ᵃ, each receiving two legs of a core 293 (see Figure 21). Members 294 and 296, with their respective cores 293 and windings set into their respective slots, are assembled by screws (not shown) by pressing the uppermost parts 294ᵈ of members 299 into the rabbet 296ᵇ of 296 so that slots 296ᶜ connect with upper parts of T-slots 300 of member 294.

The lower series of twelve cores fit in slots 300ᵃ, the cores of the upper series of twelve generating units fit in slots 296ᶜ, and the T-slot 300 is common to both sets of generator units for retaining their pole pieces 303 and spacers 301 and 302.

Cores 293 are clamped by washer 294ᵇ which is held to member 294 by screws 294ᶜ shown in Figure 22. The cores 293 of the upper set of twelve armature units are likewise clamped by a washer 296ᵃ held by screws (not shown) to member 296. A ring 294ᵃ also functions as a closure of slots at base of member 294. Spacers 301 and 302, preferably made of non-magnetic material, are received between the ends and core pieces 303 of the U-shaped core members, the spacers 302 being entered into the slots 300 during the above described assembly and determining also the spacing between the upper and lower series of generator elements.

Thus, the moving parts of the generator units are dependably assembled to present the T-shaped pole pieces 303 of the cores 293 in an imaginary cylindrical surface spaced from the imaginary cylindrical surface of the pole pieces 286 by the dimension of the desired air gap, and are dependably supported by the part 259 to be rotated therewith upon the energization of the motor 272—282.

The member 259 is rotated at a suitable speed, preferably selected with reference to other factors, as will now be clear and as was earlier described above, and preferably also with reference to the rate of drive of the bowl-like common electrode member 250. Illustratively, the latter, as in the earlier described embodiments, may be driven by its motor in the motor casing 251 at a speed of 1150 R. P. M. and the member 259 at a speed of 1740 R. P. M. The relative speed as between the two members 250 and 259 and hence as between the common electrode 250 which transports the flour particles and the individual electrodes 258 is, with the two members rotating in the same direction about the central vertical axis (for example, clockwise in Figure 22), the difference between these two speeds and hence 590 R. P. M. But the relative speed between the elements of the generator units is 1740 R. P. M., the field producing elements being stationary, and these parts may be designed so that each generator unit produces a terminal potential of about 17 kilovolts. Depending upon the number of generator units in any circular series or upon other factors, such as the number of the respective relatively moving parts thereof, the frequency of output of each generator unit may be determined as desired and with the illustrative arrangement the frequency may be on the order of 348 cycles per second if the generator elements are related as in Figure 19 or half of that, namely, 174 cycles per second, if the elements are interrelated as in Figure 20. The selected high potential at the selected frequency is, of course, made effective in the treatment zone which, as is now clear, is in the gap or space between the series of electrodes 258 and the common electrode member 250, the disruptive discharges in the gap of each electrode 258 taking place at a rate which is a function of the frequency.

Here again, the movement of the flour or any particle thereof upwardly along the inner surface of the member 250 is a composite one, being both helical and spiral, and as the flour passes upwardly into and through the treatment zone in a layer which is in effect the frustrum of a hollow cone, the electrodes 258 rotate and thus maintain disruptive discharges of sufficient duration, frequency and number throughout the circumferential extent of the treatment zone or of the layer of flour moving therein. By staggering the electrodes or providing more than one circular series, this effect is duplicated throughout a circular or circumferential extent different from that caused by any other electrode with it is not in circular alinement. Thus, no insect life in the flour can possibly escape sterilization.

A number of additional advantages result from the arrangement of Figures 21 and 22. For example, the conductors 298 leading from the generator windings to the respective electrodes can be made very short, and thus there is a minimum capacitance to ground, with the result that the frequency of the alternating current energy may be materially increased. Higher generator speeds may be employed and hence a lesser number of generator units or elements thereof. Also, greater compactness of construction may be achieved.

The generator units again have the inherent capacity of being incapable of delivering an amount of energy beyond a certain value, as was described in connection with Figures 11-20, and thus again danger of giving rise to an explosive character of electrical discharge, such as an arc-over, negatived.

With an arrangement like that of Figures 21 and 22, also, due to such factors as the higher frequency that may be employed with consequent increased rate of disruptive discharge at each electrode, the rate of movement of the flour through the treatment zone may be increased and that, as is now clear, may be arrived at by suitably correlating the rate of rotation of the common electrode and transport member 250, and the shape of its interior surface.

Thus, it will be seen that my invention is capable of embodiment in various forms of which the three above described are illustrative. In each the objectives of thorough and efficient destruction of insect life in bulk comminuted products, of which flour is an illustration, and safety of operation in that danger of dust explosion is reliably eliminated or negatived, are successfully achieved. In the annularly shaped space between the common electrode, the interior surface of which is generally frusto-conical, and the part or surface along or in which the electrodes are arranged (see Figure 3, 11 and 21), including the treatment zone, the creation of a dust-like atmosphere is dependably avoided and thus the treatment under the disruptive discharge, preferably controlled or limited as to the magnitude of the energy, may safely take place. An arc-over or such a heavy discharge as might cause burning or charring of the product, which might be accompanied by the passage over the upper edge of the common electrode and transport member of high temperature or red hot particles or clumps of the product, cannot take place.

In the annular space outside of the bowl-like transport member, it is immaterial if, as the product is discharged over the upper edge of the transport member, a dust atmosphere is created, for the latter is, if present, isolated from the treatment zone and is, moreover, definitely prevented from moving or filtering back into the treatment zone where the sterilization discharge takes place. To these preventive actions, several actions and structural features may contribute. For example, whatever air accompanies the product as it enters the apparatus from above, that is, through the member 45 of Figures 3 and 11, and the member 243 of Figure 21, is carried or forced on in the same general path that is taken by the product so that in the above-mentioned discharge space exteriorly of the electrode and transport member, there is a tangential and downward movement of air which is effective to move any dust downwardly toward the discharge opening of the apparatus, at the bottom, thus preventing dust from backing up into the discharge zone. This movement of the air may be aided by the centrifugal forces exerted by it due to the rotating bowl-like member, which may thus act to effect movement of the air in a manner analogous to the movement of the flour.

If desired, this action may be aided. For example, should the external surface of the bowl-like member tend, due to its rotation and shape, to effect a movement of air upwardly and along it, I provide annular deflectors 305 on this outer surface, for example, one at the upper end of the member 73 of Figures 3 and 11, or several suitably spaced, as in Figure 21, shaping the deflecting surfaces appropriately so as to turn any upwardly moving stream of air tangentially outwardly and thus back into the stream of downwardly moving flour, air and whatever dust might be present in this discharge region.

Or this action might be forcibly aided, as in the arrangement shown in Figure 21, where it is also desirable to prevent flour or particles thereof from passing upwardly between the closely adjacent surfaces of the relatively moving parts 270 and 232. Here I may provide in the outer cylindrical edge face of the part 259$^a$ a suitable number of air impelling blades, or vanes of suitable shape or construction, conveniently formed, as is better shown in Figure 22, as by milling slots 306 of appropriate radial depth and appropriate angle to provide each a surface of the right inclination to move air in a downward direction, as viewed in Figure 21, and thus into the upper end of the generally annular discharge space which receives the flour from the upper peripheral edge of the rotating bowl-like member. Suitable means may be provided for ingress of air into the space between the parts 270 and 232 as, for example, a conduit 307 leading to a suitable source of air supply, such as the atmosphere, but preferably through an air filter 308.

With such an arrangement not only is flour prevented from moving up into the moving parts of the apparatus but also the isolation of any dust atmosphere in the discharge space from the treatment zone is aided. Preferably, the apparatus frame or housing is grounded in any suitable way, as indicated at 309 in Figures 3, 11 and 21.

Thus, it will be seen that there has been provided in this invention a method and apparatus in which the various objects heretofore noted, together with many thoroughly practical advantages, are successfully achieved. It will be seen that the apparatus is of dependable and thorough action and is characterized by safety of operation throughout. The apparatus is also compact and may be readily installed in existing mills and coupled into operative relationship at any suitable point in the processing or line of treatment machinery employed in the mill for the particular product.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. An apparatus for subjecting a comminuted product to electrical discharge comprising an electrode member having means mounting it for rotation about a vertical axis, said member having an inner surface concentric with said axis and of varying radius so that it slopes upwardly and outwardly, electrode means spaced inwardly of said inner surface and forming a treatment zone therebetween, with means for impressing a potential difference between said electrode means and said electrode member to effect electric discharge therebetween at a region of greater radius, means for rotating said member to move the particles of the product in curved paths and by the centrifugal force they exert to lay them against said inner surface and, with respect to the upward and outward slope of said interior surface, to progress them toward regions of larger radius and through said treatment zone to be subjected to said electric discharge, said electrode means having means for supporting it for rotational movement about the axis of said electrode member, and means for effecting rotary movement of said electrode means during rotation of said electrode member and thereby traverse said electrode means relative to the product progressing along the inner surface of said rotating electrode member.

2. In apparatus of the character described, in combination, a casing having means forming an inlet passageway at its upper end and an outlet passageway at its lower end, said inlet passageway comprising a tube-like substantially cylindrical product-guiding member, an elongated supporting element extending downwardly through said member and having means for supporting and holding it against rotation, said supporting element having mounted at its lower end the stator element of an electric motor, a sleeve shaft rotatably supported by said supporting element above said stator and carrying at its lower end an electrode member presenting an interior substantially frusto-conical product-supporting surface that is concentric with said sleeve shaft and that is of increasing radius in an upward direction and extends externally about said first-mentioned member, electrode means, means insulatingly supporting said electrode means in the space between said product-supporting surface and said first-mentioned member and spaced inwardly from said surface to form a treatment zone therebetween, means for impressing a potential difference between said electrode means and said electrode member to effect electric discharge therebetween, and driving means for rotating said electrode member and comprising a rotor element companion to said stator element and having mechanical connection with said electrode member, said outlet passageway comprising an annular product-guiding member having means for guiding it to product discharged peripherally from said rotating electrode member.

3. An apparatus as claimed in claim 2 in which said electrode means comprises a plurality of individual electrodes and said supporting means therefor comprises sectionalized means of insulating material, each section carrying at least one electrode, and means coacting with said first-mentioned member for holding said sections grouped together to form substantially an annulus.

4. An apparatus as claimed in claim 2 in which said supporting means for said electrode means is rotatable and has means coacting with said first-mentioned member to support it for rotation about the latter, and means for driving it to traverse the electrode means relative to the rotating product-supporting surface of said electrode member.

5. An apparatus as claimed in claim 2 in which said electrode means comprises a plurality of electrodes and the means for impressing a potential difference between said electrode member and said electrodes comprises a plurality of generating means, one for each electrode and each having coacting elements one of which is rotatable relative to the other, means supporting the rotatable elements thereof from, and for rotation about, one of the members that form said inlet and outlet passageways, and means for driving said rotatable elements.

6. An apparatus as claimed in claim 2 in which the means for impressing a potential difference between said electrode member and said electrode means comprises generating means having coacting elements one of which is rotatable relative to the other, said rotatable element extending about said first-mentioned member, said first-mentioned member having means supporting said rotatable element for rotation about it, and means for driving said rotatable element.

7. An apparatus as claimed in claim 2 in which the means for impressing a potential difference between said electrode member and said electrode means comprises generating means having coacting elements one of which is rotatable relative to the other, said rotatable element being coaxial with said annular member forming said exit passageway, said annular member having means supporting said rotary element for rotation, and means for driving said rotary element.

8. An apparatus for treating a product which has the characteristic of forming a dust-like atmosphere giving rise to the danger of explosion, comprising a rotatable, bowl-like member having an interior supporting surface for the material that is concentric with the axis of rotation of said member, said surface being of increasing radius relative to the axis of rotation of said member and having an outer peripheral terminus for the discharge of material therefrom, means for feeding the material to be treated to said surface at a region in the latter corresponding to a lesser radius thereof, means for preventing the material thus fed to said member from creating a dust-bearing atmosphere, said means comprising means for rotating said member to move the particles of the product in curved paths and by the centrifugal force they exert to lay and compact them in a layer against said surface and, relative to the variation in radius of said surface, to effect movement thereof in dust-less and compacted layer-like form relative to said surface in a direction toward the region of larger radius thereof, whereby the air space adjacent said moving layer is substantially devoid of product particles and hence is kept free from attaining an explosive mixture, disruptive electric discharge means operating through said air space and upon the product moving with and along the surface of said rotating member, means forming a chamber for receiving product particles peripherally discharged from said peripheral terminus of said member, and means preventing dust-like atmosphere formed in said chamber by the discharge into it of said product particles from passing over said peripheral terminus and into said air space.

9. An apparatus for subjecting to electric discharge a product which has the characteristic of forming a dust-like atmosphere giving rise to the danger of explosion, comprising a rotatable member having an internal supporting surface for the material that is concentric with the axis of rotation of said member, said surface sloping relative to said axis and being of increasing radius relative to the axis of rotation of said member, means for feeding the material to be treated to said surface at a region in the latter corresponding to a lesser radius thereof, means for preventing the material thus fed to said member from creating a dust-bearing atmosphere, said means comprising means for rotating said member to move the particles of the product in curved paths and by the centrifugal force they exert to lay them against said surface and, relative to the variation in radius of said surface, to effect movement thereof relative to said surface in a direction toward regions of larger radius, spaced electrode means forming therebetween a treatment zone which is positioned so that said product moving relative to said inner surface passes therethrough, and means for imposing upon said spaced electrode means a potential to effect electric discharge therebetween, whereby said moving product is subjected to said electric discharge, at least one of said electrode means comprising a plurality of individual electrodes and the means for impressing a potential on the two electrode means comprising a source of alternating potential having individual circuit connections leading respectively to said individual electrodes, each of said circuit connections having interposed therein an elastor of a capacitance for limiting the energy flow therethrough, the elastor comprising a container of solid dielectric material having therein an ionizable gaseous content at a pressure below atmospheric, said content comprising one conductive element of the elastor, whereby upon excess conditions arising as would tend to increase the energy flow in the circuit of an electrode, rupture of the solid dielectric container may take place and result in such change in the gaseous content as to render it non-conductive.

10. An apparatus for subjecting to electric discharge a product which has the characteristic of forming a dust-like atmosphere giving rise to the danger of explosion, comprising a rotatable member having an internal supporting surface for the material that is concentric with the axis of rotation of said member, said surface sloping relative to said axis and being of increasing radius relative to the axis of rotation of said member, means for feeding the material to be treated to said surface at a region in the latter corresponding to a lesser radius thereof, means for preventing the material thus fed to said member from creating a dust-bearing atmosphere, said means comprising means for rotating said member to move the particles of the product in curved paths and by the centrifugal force they exert to lay them against said surface and, relative to the variation in radius of said surface, to effect movement thereof relative to said surface in a direction toward regions of larger radius, spaced electrode means forming therebetween a treatment zone which is positioned so that said product moving relative to said inner surface passes therethrough, and means for imposing upon said spaced electrode means a potential to effect electric discharge therebetween, whereby said moving product is subjected to said electric discharge, the means for impressing the potential across said electrode means comprising a generator operating at normal output with said discharge electrode means as its load, said generator having structural characteristics limiting its maximum output to said normal output, thereby to prevent dissipation of energy at said electrode means in a magnitude beyond normal.

11. An apparatus for subjecting to electric discharge a product which has the characteristic of forming a dust-like atmosphere giving rise to the danger of explosion, comprising a rotatable member having an internal supporting surface for the material that is concentric with the axis of rotation of said member, said surface sloping relative to said axis and being of increasing radius relative to the axis of rotation of said member, means for feeding the material to be treated to said surface at a region in the latter corresponding to a lesser radius thereof, means for preventing the material thus fed to said member from creating a dust-bearing atmosphere, said means comprising means for rotating said member to move the particles of the product in curved paths and by the centrifugal force they exert to lay them against said surface and, relative to the variation in radius of said surface, to effect movement thereof relative to said surface in a direction toward regions of larger radius, spaced electrode means forming therebetween a treatment zone which is positioned so that said product moving relative to said inner surface passes therethrough, and means for imposing upon said spaced electrode means a potential to effect electric discharge therebetween, whereby said moving product is subjected to said electric discharge, at least one of said electrode means comprising a plurality of individual electrodes and the means for impressing a potential across said two electrode means comprising a plurality of individual generators, one for each individual electrode, each generator having the inherent characteristic of being incapable of delivering energy in a magnitude beyond a safe value with respect to the character of discharge between the electrode means.

12. An electrical product-treating apparatus comprising a rotatable member having means mounting it for rotation about a vertical axis, said member having a product-guiding surface substantially frusto-conical, means for rotating said member to move particles of the product received against said surface in curved paths and by the centrifugal force they exert to compact and lay them against said inner surface and to progress them from portions thereof of lesser radius to portions of larger radius, a plurality of discharge electrodes, and means comprising substantially frusto-conical means extending within said rotatable member but spaced from the frusto-conical surface thereof for supporting said electrodes in distributed relation about the axis of rotation of said rotatable member and relative to the surface of the latter, said frusto-conical supporting means having a plurality of seats, one for each electrode, each electrode having means interfitting with a seat for holding it assembled to said supporting means, said interfitting means with its electrode being insertable into its seat from the interior of said frusto-conical supporting means.

13. An electrical product-treating apparatus comprising a rotatable member having means mounting it for rotation about a vertical axis, said member having a product-guiding surface substantially frusto-conical, means for rotating said member to move particles of the product received thereagainst in curved paths and by the centrifugal force they exert to compact and lay them against said surface and to progress them from portions thereof of lesser radius to portions of larger radius, a plurality of discharge electrodes, an annular member extending within said rotatable member but spaced from the surface of the latter for supporting said electrodes in spaced relation to said surface, means for rotatably supporting said annular electrode supporting member for rotation about the axis of said first-mentioned rotatable member, and means for driving said annular member about the said axis to traverse the electrodes relative to said frusto-conical surface.

14. An electrical product-treating apparatus comprising a rotatable member having means mounting it for rotation about a vertical axis, said member having a product-guiding surface substantially frusto-conical, means for rotating said member to move particles of the product received thereagainst in curved paths and by the centrifugal force they exert to compact and lay them against said surface and to progress them from portions thereof of lesser radius to portions of larger radius, a plurality of discharge electrodes, an annular member extending within said rotatable member but spaced from the surface of the latter for supporting said electrodes in spaced relation to said surface, means for rotatably supporting said annular electrode supporting member for rotation about the axis of said first-mentioned rotatable member, means for driving said annular member about the said axis to traverse the electrodes relative to said frusto-conical surface, and means electrically connected to said electrodes and responsive to the drive of said annular member for generating a potential for effecting electric discharge from said electrodes.

15. An electrical product-treating apparatus comprising a rotatable member having means mounting it for rotation about a vertical axis, said member having a product-guiding surface substantially frusto-conical, means for rotating said member to move particles of the product received thereagainst in curved paths and by the centrifugal force they exert to compact and lay them against said surface and to progress them from portions thereof of lesser radius to portions of larger radius, a plurality of discharge electrodes, an annular member extending within said rotatable member but spaced from the surface of the latter for supporting said electrodes in spaced relation to said surface, means for rotatably supporting said annular electrode supporting member for rotation about the axis of said first-mentioned rotatable member, means for driving said annular member about the said axis to traverse the electrodes relative to said frusto-conical surface, a plurality of generator units, one for each electrode and each electrically connected to an electrode, for impressing upon the electrodes a potential for electric discharge therefrom, each generator comprising two parts, at least one of which is rotatable, and means whereby rotation of the rotatable parts of said generators are driven in response to the drive of said annular member.

16. An electrical product-treating apparatus comprising a rotatable member having means mounting it for rotation about a vertical axis, said member having a product-guiding surface substantially frusto-conical, means for rotating said member to move particles of the product received thereby in curved paths and by the centrifugal force they exert to compact and to lay them against said inner surface and to progress them from portions thereof of lesser radius to portions of larger radius, a plurality of discharge electrodes, means comprising an annular member extending within said rotatable member but spaced from the frusto-conical surface thereof for supporting said electrodes in distributed relation about the axis of rotation of said rotatable member and relative to the surface of the latter, means for impressing on said electrodes a potential difference to effect electric discharge therefrom and comprising a plurality of generator units, one for each electrode and electrically connected thereto, each generator unit comprising two parts at least one of which is movable relative to the other, and means mounting and driving said movable parts about the axis of said first-mentioned rotatable member.

17. An apparatus for treating a food product made up of small particles, said apparatus comprising a rotatable member having an inside product-supporting surface generated by a sloping line moved about the axis of rotation of said member, means for supplying the product to be treated to said supporting surface, means for rotating said member to move the particles of the product received within said member in curved paths and by the centrifugal force they exert to lay them against said supporting surface in substantially a layer, means operative upon the product supported by said surface for effecting destruction of forms of insect life therein, said last-mentioned means having means mounting it for movement, and means for moving it, thereby to effect a relative traversing movement between said means and the particles of the product supported by said supporting surface.

18. In apparatus of the character described, in combination, means forming a passageway and having extending substantially along its axis a shaft-like support with means rigidly and non-rotatably supporting the latter from the former without closing off said passageway, a product-receiving member having means rotatably supporting it from, and for rotation about said shaft-like support and having an inner surface coaxial with the axis of said shaft-like support and extending outwardly therefrom and about but spaced from said passageway-forming means for receiving product discharged from the latter.

19. An apparatus as claimed in claim 18 in which the means for rotatably supporting said member from said shaft-like support comprises a sleeve-like member that envelops said shaft-like support and extends therealong and into said passageway-forming means.

20 An apparatus as claimed in claim 18 in which there is means for driving said product-receiving member and comprising an electric motor with means mechanically connecting its stationary element to said shaft-like support and means mechanically connecting its rotatable member to said product-receiving member.

21. In apparatus of the character described, in combination, means forming a passageway and having extending substantially along its axis a shaft-like support with means rigidly and non-rotatably supporting the latter from the former without closing off said passageway, a product-receiving member having means rotatably supporting it from and for rotation about said shaft-like support and having an inner surface co-axial with the axis of said shaft-like support and extending outwardly therefrom and about but spaced from said means forming a passageway for receiving product discharged from the latter, electrode means spaced from said inner surface of said member, and means for impressing a potential between said electrode means and said member to cause electric discharges therebetween and including a circuit having therein means responsive to the centrifugal action of said member for completing the circuit between said shaft-like support and said member.

22. In apparatus of the character described, in combination, means forming a passageway and having extending substantially along its axis a shaft-like support with means rigidly and non-rotatably supporting the latter from the former without closing off said passageway, a product-receiving member having means rotatably supporting it from and for rotation about said shaft-like support and having an inner surface co-axial with the axis of said shaft-like support and extending outwardly therefrom and about but spaced from said means forming a passageway for receiving product discharged from the latter, electrode means spaced from said inner surface of said member, means constituting a source of high potential current, and circuit means to connect said source of high potential current across said member and said electrode means to cause electric discharges therebetween including an electric switching means formed of metal and comprising two coextensive cups and a ball therebetween, one of said cups being an inverted stationary cup upon the lower end of said shaft-like support and the other of said cups being a rotary cup carried by said member with the two cups having rims positioned in spaced relationship, said ball being adapted to fall into the bottom of said rotary cup when said rotary cup is stationary and to thereby be out of contact with said inverted cup, and said ball being adapted, upon rotation of said rotary cup, to rise and contact the adjacent rims of said cups and form a moving electrical connection therebetween.

23. In apparatus of the character described, in combination, a rotatable member having an inside curved surface whose axis of curvature is coincident with the axis of rotation of said member, a plurality of individual electrodes, and means mounted for rotation about said axis of rotation and providing a support equidistantly holding said electrodes from said surface.

24. An apparatus for treating a food product made up of small particles, said apparatus comprising a rotatable member having an inside product-supporting surface generated by a line moved about the axis of rotation of said member, means coaxial with said axis forming a passageway for guiding the product to be treated to said supporting surface, means coaxial with said axis forming a passageway for guiding away the product discharged from said surface, means for rotating said member to move in curved paths the particles of the product supplied to said surface from said first-mentioned guiding means and by the centrifugal force they exert to lay them against said supporting surface, electrode means spaced from the latter for effecting electric discharge through the product supported against said supporting surface, and means for rotatably supporting said electrode means with respect to one of said guiding means for rotation about said axis of rotation and thereby to be traversed relative to said supporting surface.

25. An apparatus for treating a food product made up of small particles, said apparatus comprising a rotatable member having an inside product-supporting surface generated by a line moved about the axis of rotation of said member, means coaxial with said axis forming a passageway for guiding the product to be treated to said supporting surface, means coaxial with said axis forming a passageway for guiding away the product discharged from said surface, means for rotating said member to move in curved paths the particles of the product supplied to said surface from said first-mentioned guiding means and by the centrifugal force they exert to lay them against said supporting surface, electrode means spaced from the latter for effecting electric discharge through the product supported against said supporting surface, said electrode means comprising a plurality of electrodes distributed in spaced relation to said supporting surface, a plurality of generator units grouped about said axis of rotation, there being one generator unit for each electrode and said generator units comprising stationary parts and moving parts, and means for supporting the moving parts from one of said guiding means for rotation about said axis.

26. The method of treating a product which has the characteristic of forming a dust-like atmosphere giving rise to the danger of explosion, which comprises subjecting the particles of the product to rotary movement and by the centrifugal force exerted by the particles of the product to compact them against a suitable supporting surface whereby suspension of particles in the atmosphere in dust-like form is prevented, and subjecting the product while its particles are thus compacted to disruptive electric discharge.

27. The method of treating by electrical discharge a food product having the capacity of forming a dust-like atmosphere giving rise to the danger of explosion, which comprises effecting rotary movement of the particles of the product about an axis in paths substantially helical but of progressively expanding radius and by the centrifugal forces exerted by the particles of the product to compact and constrain them to said paths whereby entry of particles of the product into suspension in the adjacent atmosphere is prevented, and subjecting the product while so compacted to disruptive electric discharge.

28. The method of treating a comminuted product in air which comprises causing a centripetal force to act on the product, and to cause the product to exert centrifugal forces to effect a substantial separation of the product from its entrained air, and then subjecting the product to electrical disruptive conduction.

29. The method of treating a flowing comminuted product in air which comprises causing progressively increasing centripetal forces to act on the product and causing the product to exert progressively increasing centrifugal forces for compacting the product to a volume on the order of half its prior volume, subjecting the compacted product to disruptive electrical discharge, then causing the centripetal and centrifugal forces to collapse to effect discharge of the treated product tangentially.

30. In apparatus of the character described, in combination, a rotatable means having an internal substantially frusto-conical supporting surface for the material to be treated, means for feeding the material to be treated to said surface at a region in the latter corresponding to a lesser radius thereof, means for rotating said rotatable means to move the particles of the product in curved paths and by the centrifugal force they exert to lay them against said surface and to effect movement thereof along the latter toward regions of larger radius for ultimate peripheral discharge, spaced electrode means for subjecting the material moving along said surface to electric discharge, means extending about the discharge periphery of said rotatable means and forming a receiving chamber for the particle products discharged from said rotatable means, an air impeller means rotatable about the axis of said rotable means and having an effective air impelling action substantially throughout the extent of the peripheral discharge of product particles from said rotatable means for impelling air into said chamber and thereby block flow of particle products from said chamber back toward said supporting surface.

31. An apparatus as claimed in claim 30 in which said air impeller means comprises means carried by said rotatable means, the driving means of the latter effecting driving of said air impeller means.

32. An apparatus as claimed in claim 30 in which said air impeller means comprises a rotatably mounted ring-like means having air impeller elements distributed thereabout and means for driving said ring-like means to effect flow of air into said chamber adjacent the discharge into the latter of product particles from said rotatable means.

FRANKLIN S. SMITH.